US010019657B2

(12) United States Patent
Lin et al.

(10) Patent No.: US 10,019,657 B2
(45) Date of Patent: Jul. 10, 2018

(54) JOINT DEPTH ESTIMATION AND SEMANTIC SEGMENTATION FROM A SINGLE IMAGE

(71) Applicant: Adobe Systems Incorporated, San Jose, CA (US)

(72) Inventors: Zhe Lin, Fremont, CA (US); Scott D. Cohen, Sunnyvale, CA (US); Peng Wang, Los Angeles, CA (US); Xiaohui Shen, San Jose, CA (US); Brian L. Price, San Jose, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 467 days.

(21) Appl. No.: 14/724,660

(22) Filed: May 28, 2015

(65) Prior Publication Data
US 2016/0350930 A1    Dec. 1, 2016

(51) Int. Cl.
*G06K 9/00*    (2006.01)
*G06K 9/66*    (2006.01)
(Continued)

(52) U.S. Cl.
CPC ........... *G06K 9/66* (2013.01); *G06K 9/00664* (2013.01); *G06K 9/4628* (2013.01);
(Continued)

(58) Field of Classification Search
CPC .... G06K 9/66; G06K 9/00664; G06K 9/6272; G06K 9/4628; G06T 7/50;
(Continued)

(56) References Cited

U.S. PATENT DOCUMENTS 6,504,951 B1 *    1/2003    Luo .................... G06K 9/00664
                                                                382/165
6,711,278 B1 *    3/2004    Gu .......................... G06K 9/32
                                                                348/169

(Continued)

FOREIGN PATENT DOCUMENTS

WO    WO 2014001062 A2 *    1/2014    ............... G06T 7/50

OTHER PUBLICATIONS

Ladicy, Lubor et al., "Pulling Things Out of Perspective", 2014 IEEE Conference on Computer Vision and Pattern Recognition.*
(Continued)

*Primary Examiner* — Chan Park
*Assistant Examiner* — Elisa Rice
(74) *Attorney, Agent, or Firm* — Wolfe-SBMC

(57) ABSTRACT

Joint depth estimation and semantic labeling techniques usable for processing of a single image are described. In one or more implementations, global semantic and depth layouts are estimated of a scene of the image through machine learning by the one or more computing devices. Local semantic and depth layouts are also estimated for respective ones of a plurality of segments of the scene of the image through machine learning by the one or more computing devices. The estimated global semantic and depth layouts are merged with the local semantic and depth layouts by the one or more computing devices to semantically label and assign a depth value to individual pixels in the image.

20 Claims, 17 Drawing Sheets

(51) Int. Cl.
  *G06T 7/50* (2017.01)
  *G06K 9/62* (2006.01)
  *G06K 9/46* (2006.01)
(52) U.S. Cl.
  CPC .............. *G06K 9/6272* (2013.01); *G06T 7/50* (2017.01); *G06T 2207/20081* (2013.01)
(58) Field of Classification Search
  CPC ...... G06T 2207/20081; H04N 13/0203; H04N 2013/0081
  See application file for complete search history.

(56) References Cited

U.S. PATENT DOCUMENTS

| | | | | |
|---|---|---|---|---|
| 8,059,864 | B2* | 11/2011 | Huang | G08G 1/14 340/933 |
| 8,577,131 | B1* | 11/2013 | Li | G06K 9/6256 382/157 |
| 9,811,756 | B2 | 11/2017 | Liu et al. | |
| 2004/0125124 | A1* | 7/2004 | Kim | G06F 17/30799 715/716 |
| 2006/0159442 | A1* | 7/2006 | Kim | G06K 9/00664 396/236 |
| 2006/0251337 | A1* | 11/2006 | Redert | G06T 7/564 382/285 |
| 2007/0121094 | A1 | 5/2007 | Gallagher et al. | |
| 2007/0156617 | A1* | 7/2007 | Szummer | G06K 9/00409 706/20 |
| 2008/0150945 | A1* | 6/2008 | Wang | G06K 9/20 345/427 |
| 2008/0304743 | A1 | 12/2008 | Tang et al. | |
| 2011/0274366 | A1* | 11/2011 | Tardif | G06T 5/002 382/260 |
| 2013/0155061 | A1 | 6/2013 | Jahanshahi et al. | |
| 2014/0240464 | A1* | 8/2014 | Lee | G01S 17/08 348/47 |
| 2015/0371440 | A1 | 12/2015 | Pirchheim et al. | |
| 2017/0053412 | A1 | 2/2017 | Shen et al. | |

OTHER PUBLICATIONS

Arbelaez,"Contour Detection and Hierarchical Image Segmentation", Retrieved from <http://www.cs.berkeley.edu/~arbelaez/publications/amfm_pami2011.pdf> on Nov. 28, 2012, 2011, 20 pages.
Boix,"Harmony Potentials—Fusing Global and Local Scale for Semantic Image Segmentation", Int J Comput Vis, 2012, 20 pages.
Carreira,"Semantic Segmentation with Second-Order Pooling", European Conference on Computer Vision 2012, 2012, 14 pages.
Eigen,"Depth Map Prediction from a Single Image using a Multi-Scale Deep Network", In NIPS, 2014., 2014, 9 pages.
Eigen,"Nonparametric Image Parsing using Adaptive Neighbor Sets", In CVPR, 2012, 8 pages.
Farabet,"Learning Hierarchical Features for Scene Labeling", In TPAMI, 2013, 15 pages.
Girschick,"Rich feature hierarchies for accurate object detection and semantic segmentation Tech report (v5)", Computer Vision and Pattern Recognition (cs.CV), Jun. 2014, 21 pages.
Gould,"Decomposing a Scene into Geometric and Semantically Consistent Regions", Computer Vision, 2009 IEEE 12, 2009, 9 pages.
Gupta,"Learning Rich Features from RGB-D Images for Object Detection and Segmentation", Computer Science > Computer Vision and Pattern Recognition, 2014, 16 pages.
Hane,"Joint 3D Scene Reconstruction and Class Segmentation", IEEE Conference on Computer Vision and Pattern Recognition (CVPR), 2013, 2013, 8 pages.
Hoiem,"Recovering Occlusion Boundaries from an Image", Int. J. Comput. Vision 91, 3 (Feb. 2011)., Feb. 2011, 8 pages.
Hoiem,"Recovering Surface Layout from an Image", International Journal of Computer Vision 75(1), Feb. 2007, 22 pages.
Karsch,"Depth Extraction from Video Using Non-parametric Sampling", Pattern Analysis and Machine Intelligence, IEEE Transactions on, 2014., 2014, 14 pages.
Krizheysky,"ImageNet Classification with Deep Convolutional Neural Networks", NIPS 2012, 2012, 9 pages.
Ladicky,"Pulling Things out of Perspective", Jun. 2014, 8 pages.
Leordeanu,"Efficient Closed-Form Solution to Generalized Boundary Detection", Computer Vision—ECCV 2012, Lecture Notes in Computer Science vol. 7575, 2012, 14 pages.
Liu,"Discrete-Continuous Depth Estimation from a Single Image", Conference on Computer Vision and Pattern Recognition (CVPR), 2014, 8 pages.
Liu,"Single Image Depth Estimation From Predicted Semantic Labels", Conference on Computer Vision and Pattern Recognition (CVPR), 2010, 8 pages.
Ren,"RGB-(D) Scene Labeling: Features and Algorithms", Conference on Computer Vision and Pattern Recognition (CVPR), 2012, 8 pages.
Russell,"LabelMe: a database and web-based tool for image annotation", IJCV 2007, May 2008, 33 pages.
Saxena,"Make3D: Learning 3D Scene Structure from a Single Still Image", Transactions on Pattern Analysis and Machine Intelligence, IEEE (vol. 31 , Issue: 5 ), May 30, 2008, 16 pages.
Silberman,"Indoor Segmentation and Support Inference from RGBD Images", ECCV 2012, 2012, 14 pages.
Singh,"Nonparametric scene parsing with adaptive feature relevance and semantic context", Conference on Computer Vision and Pattern Recognition (CVPR), 2013, 7 pages.
Tighe,"SuperParsing: Scalable Nonparametric Image Parsing with Superpixels", ECCV'10 Proceedings of the 11th European conference on Computer vision:, 2013, 14 pages.
Xiao,"SUN Database: Large-scale Scene Recognition from Abbey to Zoo", In CVPR, 2010, 2010, 8 pages.
Yang,"Context Driven Scene Parsing with Attention to Rare Classes", CVPR 2014, 2014, pp. 4321-4328.
Zheng,"Dense Semantic Image Segmentation with Objects and Attributes", In CVPR, Columbus, Ohio, United States, 2014., 2014, 2 pages.
Zhu,"Semi-Supervised Learning Using Gaussian Fields and Harmonic Functions", ICML 2003, 2003, 8 pages.
"Pre-Interview Communication", U.S. Appl. No. 14/832,328, dated Jul. 28, 2017, 5 pages.
"Combined Search and Examination Report", GB Application No. 1605125.2, dated Sep. 21, 2016, 5 pages.
Mousavian,"Joint Semantic Segmentation and Depth Estimation with DEEP Convolutional Networks", https://arxiv.org/abs/1604.07480, Apr. 25, 2016, 9 pages.
Wang,"Toward Unified Depth and Semantic Prediction from a Single Image", IEEE Conference on Computer Vision and Pattern Recognition (CVPR), Jun. 2015, 10 pages.
"Pre-Interview Communication", U.S. Appl. No. 14/832,328, dated Feb. 22, 2018, 7 pages.

* cited by examiner

1000

Overlapping Areas 1002

JOINT DEPTH ESTIMATION AND SEMANTIC SEGMENTATION FROM A SINGLE IMAGE

BACKGROUND

Depth estimation in images is typically utilized to estimate a distance between objects in an image scene and a camera used to capture the images. This is conventionally performed using stereoscopic images or dedicated depth sensors (e.g., time-of-flight or structured-light cameras) to identify objects, support gestures, and so on. Accordingly, this reliance on dedicated hardware such as stereoscopic cameras or dedicated depth sensors limits availability of these conventional techniques.

Semantic labeling in images is utilized to assign labels to pixels in an image, such as to describe objects represented at least in part by the pixel, such as sky, ground, a building, and so on. This may be utilized to support a variety of functionality, such as object removal and replacement in an image, masking, segmentation techniques, and so on. Conventional approaches used to perform semantic labeling, however, are typically solved separately or sequentially from depth estimation using different and unrelated techniques, lack accuracy, and may result in propagation of errors formed at early stages in the performance of the techniques to later stages.

SUMMARY

Joint depth estimation and semantic labeling techniques are described that are usable for processing of a single image. In one or more implementations, global semantic and depth layouts are estimated of a scene of the image through machine learning by the one or more computing devices. Local semantic and depth layouts are also estimated for respective ones of a plurality of segments of the scene of the image through machine learning by the one or more computing devices. The estimated global semantic and depth layouts are merged with the local semantic and depth layouts by the one or more computing devices to semantically label and assign a depth value to individual pixels in the image.

In one or more implementations, a system comprises one or more computing devices implemented at least partially in hardware. The one or more computing devices are configured to perform operations including estimating global semantic and depth layouts of a scene of an image through machine learning, decomposing the image into a plurality of segments, guiding a prediction of local semantic and depth layouts of individual ones of the plurality of segments using the estimated global and semantic depth layouts of the scene, and jointly forming a semantically-labeled version of the image in which individual pixels are assigned a semantic label and a depth map of the image in which individual pixels are assigned a depth value.

In one or more implementations, a system includes a global determination module implemented at least partially in hardware that is configured to estimate global semantic and depth layouts of a scene of an image through machine learning. The system also includes a local determination module implemented at least partially in hardware that is configured to estimate local semantic and depth layouts for respective ones of a plurality of segments of the scene of the image through machine learning. The system further includes a merge calculation module configured to merge the estimated global semantic and depth layouts with the local semantic and depth layouts to semantically label and assign a depth value to individual pixels in the image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
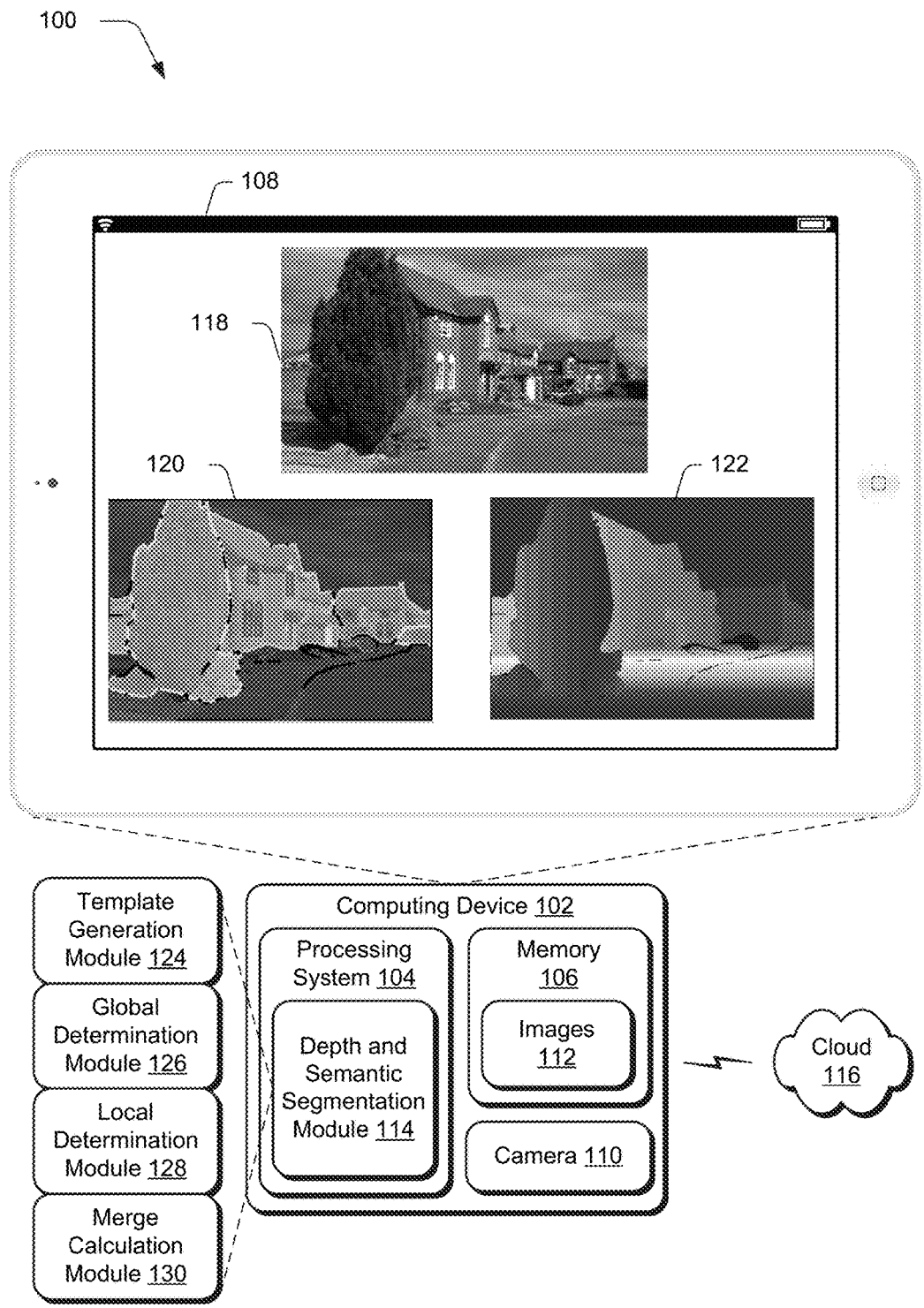
FIG. 1 is an illustration of an environment in an example implementation that is operable to employ techniques usable to perform joint depth estimation and semantic labeling of a single image described herein.

Semantic segmentation and depth estimation are two fundamental problems in image understanding. While it has been found that the two tasks are strongly correlated and mutually beneficial, conventionally these problems are solved separately or sequentially using different techniques which leads to inconsistencies, errors, and inaccuracies.

In the following, a complementary effect from the typical failure cases of the two tasks is observed, which leads to a description of a unified coarse-to-fine framework for joint semantic segmentation and depth estimation that is usable for a single image. For example, a framework is proposed that first predicts a coarse global model composed of semantic labels and depth values (e.g., absolute depth values) through machine learning to represent an overall context of an image. The semantic labels describe "what" is being represented by respective pixels in the image, e.g., sky, plant, ground, wall, building, and so forth. The depth values describe a distance between a camera used to capture a scene in the image and respective objects in the scene represented by the pixel, e.g., a "z" distance in the scene captured by the image.

The image is then segmented to define local portions (e.g., individual objects or parts of objects) of the overall global image and by embedding the global model the semantic labels and depth values for each pixel in a respective local segmentation is also predicted using machine learning, Semantic labels are also learned to locally tag pixels with the segment. The depth values are normalized for relativity within the segment, one to another, and thus do not describe an absolute distance value but rather describe a relationship of depth between pixels within the segment.

The predictions for the segments for the semantic labels and depth values from the segments are then merged and guided by the semantic labels and depth values from the global model, e.g., through conditional random field (CRF). This produces a fine-level estimation to form a semantically-labeled image in which each pixel in the image is given a semantic label and a depth map in which each pixel in the image is assigned a depth value representing an absolute distance value between the camera and objects represented by the pixel. Further, by enforcing the consistency between depth values and semantic labels and by using guidance from the global context, these techniques effectively take the advantages of these two components and provide state-of-the-art results overall conventional techniques. Additional techniques may also be employed as part of this joint estimation, such as to perform the machine learning in a template classification context, to smooth values in the semantic labels and depth values, enforce object boundaries within the image, and so on as further described in the following.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques usable to perform joint depth estimation and semantic labeling of a single image described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 17.

The computing device 102 is illustrated as including a variety of hardware components, examples of which include a processing system 104, an example of a computer-readable storage medium illustrated as memory 106, a display device 108, a camera 110 usable to capture images 112, and so on. The processing system 104 is representative of functionality to perform operations through execution of instructions stored in the memory 106. Although illustrated separately, functionality of these components may be further divided, combined (e.g., on an application specific integrated circuit), and so forth.

The processing system 104 is illustrated as executing a depth and semantic segmentation module 114 which is storable in the memory 106 and as such is implemented at least partially in hardware. The depth and semantic segmentation module 114 is executable by the processing system 104 to cause performance of one or more operations. Other implementations are also contemplated, such as implementation as dedicated hardware components, e.g., application specific integrated circuit, fixed-logic circuitry, implemented "over the cloud 116," and so forth.

The depth and semantic segmentation module 114 is representative of functionality to take as input a single image 118 (which may or may not correspond to image 112) and from that image 118 generate a semantically-labeled image 120 and a depth map 122. The semantically-labeled image 120 describes "what" is being represented by individual pixels in the image 118, e.g., a tree, house, ground, and sky as illustrated for the image 118. The depth map 122 includes absolute depth values that indicate how far away the objects represented by respective pixels in the image 118 are located from a camera 110 that captured the image 118, i.e., a "z" distance. Although the camera 110 is illustrated as part of the computing device 102, it should be apparent that the image 118 may be captured by other devices and stored on the computing device 102 and/or over the cloud 116 for processing.

In order to perform the joint depth estimation and semantic labeling of the image 118, the depth and semantic segmentation module 114 employs a variety of different functionality. Examples of this functionality include a template generation module 124 that is usable to generate global and local templates that are used in machine learning as part of a classification problem to arrive at depth values and semantic labels for images 118, further discussion of which is included in a description of FIG. 2 in the following. Other examples that do not employ templates are also contemplated as further described in the following.

Additional examples of this functionality include global and local determination modules 126, 128 that are usable to estimate global and local semantic labels and depth values, respectively, to form global and local semantic and depth layouts, and thus follow a coarse to fine process. Further description of global and local semantic and depth layout determination is included in a discussion of FIGS. 3 and 4. A further example of this functionality is illustrated as a merge calculation module 130 that is usable to merge the global and local semantic and depth layouts to arrive at a semantically-labeled image 120 and a depth map 122, further discussion of which is included in a corresponding description of FIG. 4 in the following.

In the following, it is shown that through joint training with both semantic labels and depth values, consistency between semantic and depth predictions is achieved. In addition, a global to local strategy preserves a long range context for generating globally reasonable results which maintains segment boundary information. Further, the machine learning techniques as described below provide robust estimation under large appearance variation of images and segments. The semantically-labeled image 120 and a depth map 122 are usable to support a variety of functionality, such as object detection, object recognition and pose estimation, lens blur, image in-painting, object removal, robotics and relighting for graphics usages, and so forth.

Figure 2:
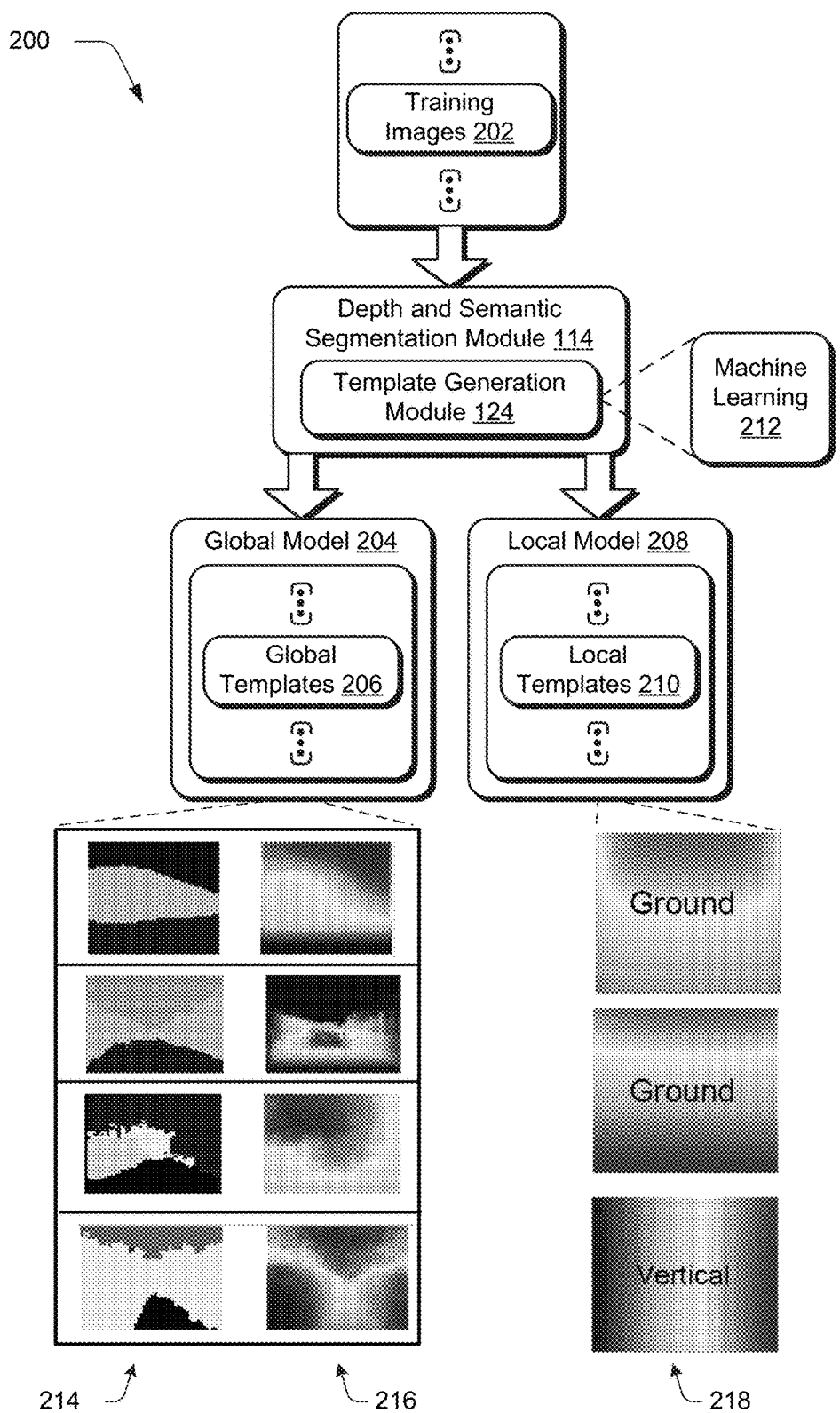
FIG. 2 depicts a system in an example implementation showing operation of the template generation module of a depth and semantic segmentation module of FIG. 1 in greater detail.
Figure 3:
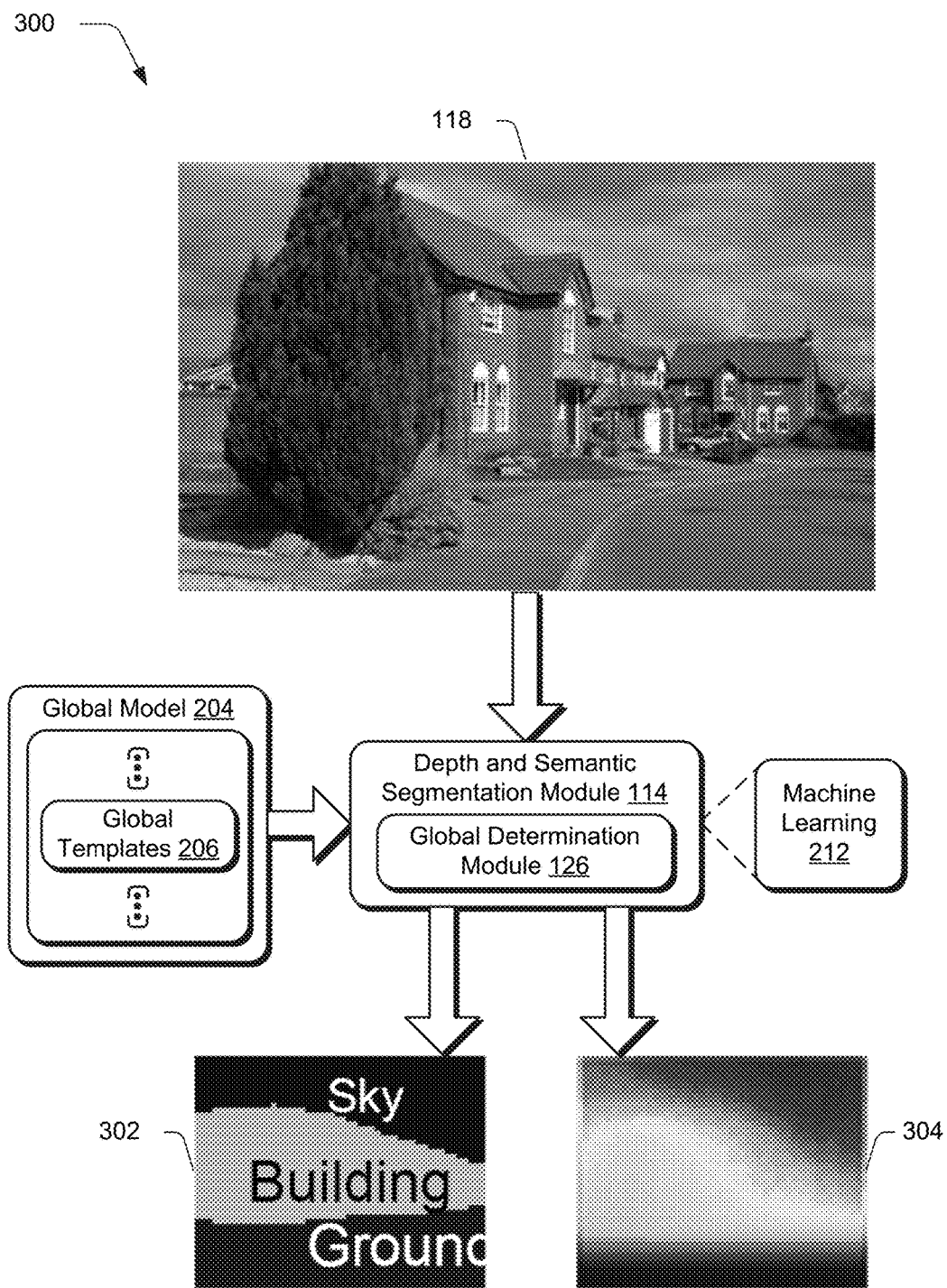
FIG. 3 depicts a system in an example implementation showing operation of a global determination module of a depth and semantic segmentation module of FIG. 1 in greater detail.
Figure 4:
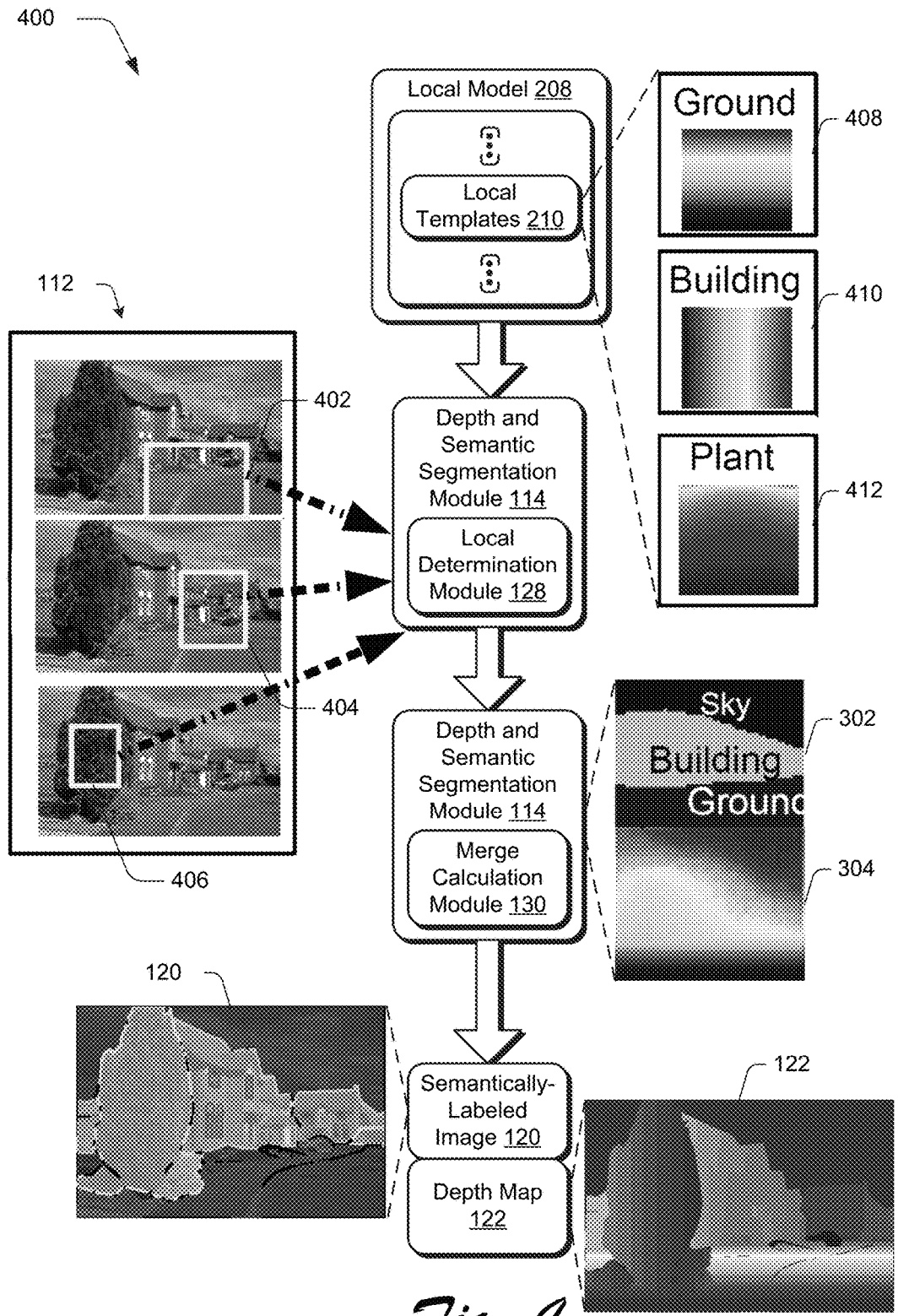
FIG. 4 depicts a system in an example implementation showing operation of a local determination module and a merge calculation module of a depth and semantic segmentation module of FIG. 1 in greater detail.

Reference will now be made generally to FIGS. 2-4 to describe interrelation of functionality of the template generation module 124, global determination module 126, local determination module 128, and merge calculation module 130 of FIG. 1. Given an image 118 as shown in FIG. 3, the global determination module 126 first uses machine learning to estimate global semantic and depth layout 302, 304, which may be performed using global and local templates or other techniques.

In the illustrated example, a global semantic layout 302 is shown as giving a rough estimate of a building at a center, ground at a bottom of the image 112, and sky at a top of the image and thus roughly semantically labels pixels in the image as corresponding to particular objects. In addition, the global determination module 126 also generates a global depth layout 304 of the image giving absolute depth values for pixels in the image as described above and thus provides a "z" distance between objects represented by the pixels and a camera 110 used to capture the image 118.

Once the global semantic and depth layouts 302, 304 have been generated, the depth and semantic segmentation module 114 then segments the image 112 into a plurality of segments using the local determination module 128, which may include multilevel segmentation in which different segment sizes are generated for the image 118. The local determination module 128 then generates local semantic and depth layouts for the segments individually, such as to describe whether a majority of the segment represents the ground, part of a building, or a plant. The local depth layout describes relative depth values for pixels in the segment that describe a depth of the pixels in relation to each other (e.g., a local depth transition), but not an absolute value in the "z" distance as described above.

The depth and semantic segmentation module 114 then employs the merge calculation module 130 to merge the global and local semantic layouts to form the semantically labeled image 120 and the global and local depth layouts to form the depth map 122. The merge calculation module 130 constructs the semantically-labeled image 120 by combining the semantic predictions from the segments in the local semantic layout into a refined semantic prediction map that is smoothed between the segments and guided by a global semantic layout. Additionally, the merge calculation module 130 combines the local depth transition of segments into a refined depth map 122 by leveraging absolute depth values of the global depth layout and relative depth values from the local depth layout.

In order to perform these techniques, the depth and semantic segmentation module 114 may employ a variety of different machine learning 212 techniques, such as a convolutional neural network (CNN), support vector regression (SVR), and so on. For example, the depth and semantic segmentation module 114 may employ machine learning 212 using a plurality of neural layers to learn a model that directly predicts semantic labels and depth values for each pixel in the image 112. In another example, the template generation module 124 may be used to generate global and local templates that are generated from training data and usable to guide a machine learning 212 process through a classification problem, an example of generation of the templates is further described in the following.

FIG. 2 depicts a system 200 in an example implementation showing operation of the template generation module 124 of FIG. 1 in greater detail. The template generation module 124 is representative of functionality that is usable to employ machine learning 212 (e.g., via a convolutional neural network) to process images to arrive at a global model 204 that is usable to describe a scene captured by an image using global templates 206. The template generation module 124 is also representative of functionality that is usable to generate a local model 208 that describe portions of the scene within a segment from the image 118 using a local model 208 and corresponding local templates 210.

In support of the techniques described herein, it has been observed that nature scene images contain certain layouts in a global context, such as street view, ocean, scenery, trees, buildings, and so on. Thus, the prediction of semantic labels and depth layout of the image 118 as a whole may be addressed as a template classification problem in which an image 118 is processed by matching the image 118 to corresponding global templates 206 in order to learn likely semantic labels and depth values for a scene in the image 118.

In order to generate the global templates 206 that form the global model 204, the template generation module 124 utilizes machine learning 212 to process training images 202 to learn global templates that coarsely describe a global semantic layout 214 that tags individuals pixels as corresponding to a semantically described type of object, e.g., sky, ground, plant, building, and so on. Machine learning 212 is also performed to jointly learn a global depth layout 216 of global depth values that describe absolute distances of an object in a scene captured by an image in relation to a camera 110 that captured the image. For example, similar shades and/or colors may be used to represent similar "z" depths in the scene.

A kernel k-means technique is used to form the global templates 206 with the distance from semantic label ground truth and depth ground truth that are associated with each training image 202 in the dataset of FIG. 2. Formally, the distance between image $I_i$ and image $I_j$ may be written as follows:

$$k(I_i,I_j)=\lambda_1\|I_{si}-I_{sj}\|_0+\lambda_2\|\log I_{di}-\log I_{dj}\|_1 \quad (1)$$

where $I_{si}$ and $I_{di}$ are the ground truth semantic label and depth of image $I_i$ respectively.

Figure 5:
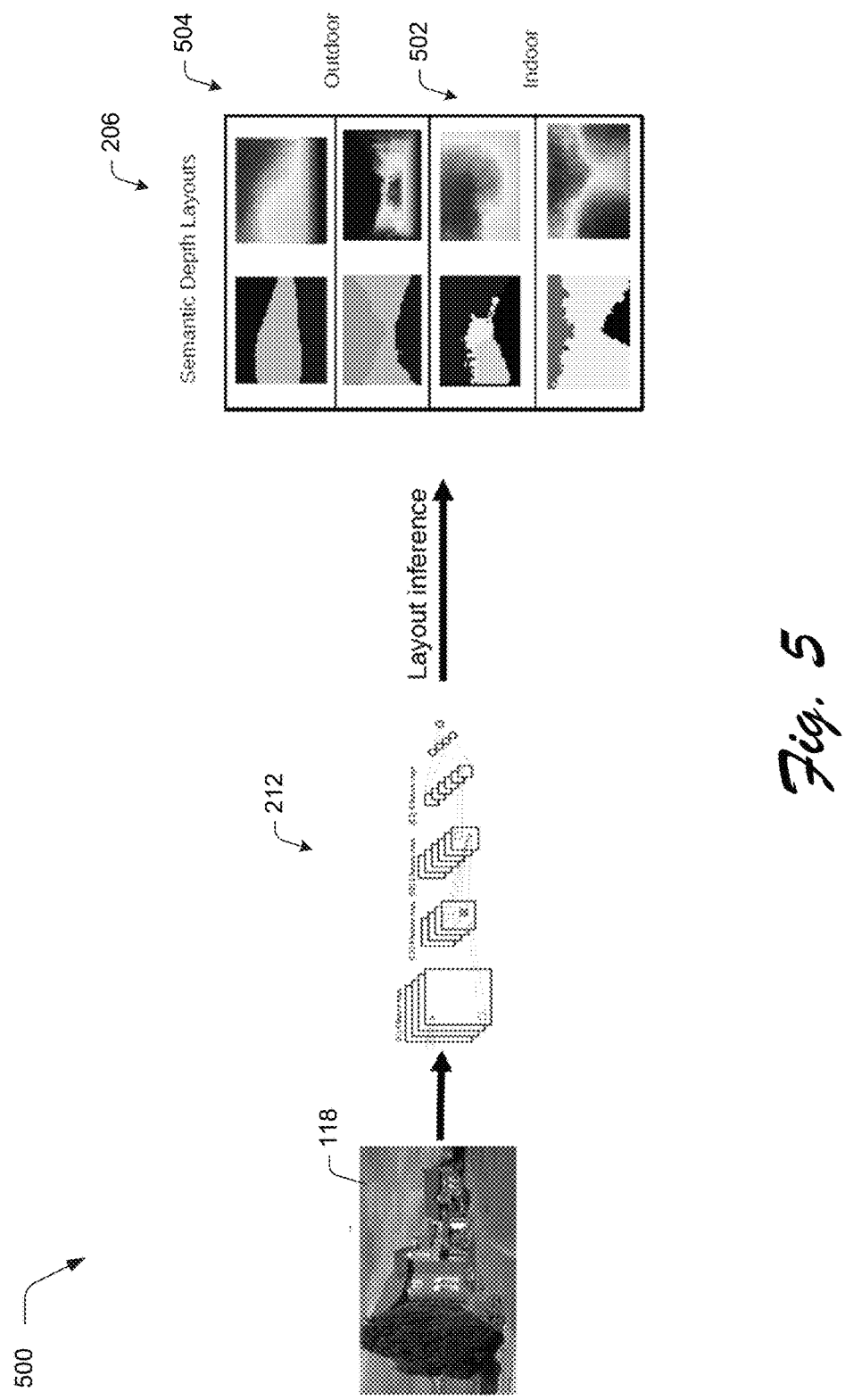
FIG. 5 depicts an example of machine learning implemented as a convolutional neural network to classify an image according to a pool of global templates.

In detail, the ground truth is resized to a size of fifty pixels by fifty pixels to avoid influence from small local variation. In addition, clusters for indoor 502 and outdoor 504 scenes are separated as the different scale of depth and different number of semantic labels as shown in an example implementation of FIG. 5. For outdoor 504, an initial cluster number is set at seventy.

In order to include enough variations of templates and avoid outliers, a max number (300) and a min number (10) is set for each class in this example. Respectively, the kernel k-means technique separates the class into three sub-classes if the number of images inside is larger than three hundred and is pruned if the number of images in the class is smaller than ten. Having the pool of global templates 206 at hand, each training image 202 is assigned into a respective one of the global templates 206 based on the distance from Equation 1 above, and a machine learning 212 classifier is tuned to classify each image into one of the global templates.

FIG. 3 depicts a system 300 in an example implementation in which operation of the global determination module 126 of the depth and semantic segmentation module 114 is shown to calculate a global semantic and depth layout 302, 304 for an image 118. As previously described, the global determination module 126 arrives at a coarse description of semantic labels of the image 118 that is expressed as a global semantic layout 302. In the illustrated example, the global semantic layout 302 generally describes a sky, building, and ground. Likewise, the global determination module 126 arrives at a coarse description of a global depth layout 304 of the image 118, which as illustrated indicates that the ground is the closest and progresses away in the z direction and the building also progresses away in the z direction with the sky being the furthest away.

In order to perform this estimation, the global determination module 126 employs the global templates 206 as examples as part of machine learning 212 to locate one or more of the global templates 206 that correspond to the image 118. These global templates 206 thus have a likelihood of providing correct semantic labels and depth values for the image as a global semantic layout and global depth layout, respectively. More formally, as shown in an example implementation 500 of FIG. 5, through machine learning 212 (e.g., a learned CNN), an image 118 is classified according to a pool of global templates 206 with certain confidence in order to determine global semantic labels for pixels expressed as a global semantic layout.

Given an image I, machine learning 212 operates as a global machine learning classifier C to classify the image 118 into a respective one of a plurality of global templates 206 $T=\{T_i\}_{i=1}^N$, where N is the number of templates generated and $T_i$ is a m×n×2 matrix where m×n is the templates size and it concatenated a semantic map $S_i$ and a depth map $D_i$.

Practically, however, the global template $T_i$ of image i may not fit the image layout as it is a class center representation. Thus, rather than using a single template, a combination of top K global templates 206 may be used to represent the image with the classification score obtained from machine learning 212.

Figure 6:
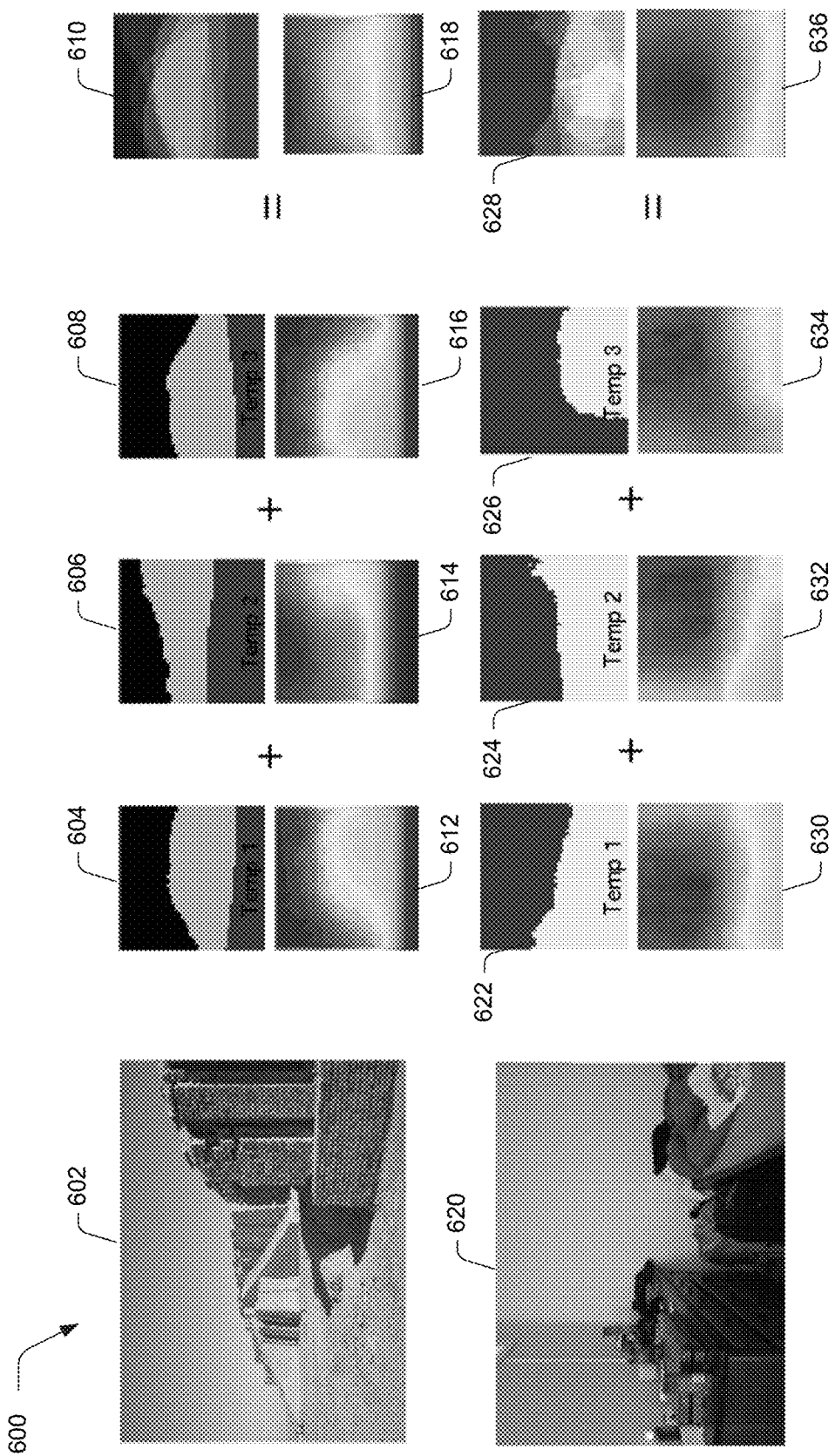
FIG. 6 depicts an example of a combination of global templates used to arrive at an estimation of a global semantic and depth layouts.

FIG. 6 depicts an example 600 of such a combination of global templates to arrive at an estimation of a global semantic and depth layouts. For image 602, global semantic layouts 604, 606, 608 from respective global templates are combined to form a global semantic layout 610 that more accurately describes the semantic layout of the image 602 than any one individual global template. Likewise, global templates describing a global depth layout 612, 614, 616 are combined to form a global depth layout 618 that also more accurately describes the depth of objects in the image 602 than any particular one of the templates. Another example for image 620 is illustrated in which global semantic layouts 622, 624, 626 are combined to form global semantic layout 628 to provide probabilities of semantic tags in the image 620 and global depth layouts 630, 632, 634 are combined to form global depth layout 636.

Formally, given the top K templates $\{T_j\}_{j=1}^K$ and corresponding score $s_j$, a global probabilistic layout $I_{ti}$ is produced, where $I_{ti}$ is a m×n×d matrix, m, n are the global template dimensions, and $d=d_s+d_d$ where $d_s$ is the number of semantic labels and $d_d$ is the combined depth map, which indicates that the template concatenates a probability distribution over semantic labels and a combined depth value for each pixel. Formally, for semantic labels c, given the $j_{th}$ prediction, an expression $P(c|x)j=e(S_j(x))$ is obtained and the over each distribution is $P(c|x)=\Sigma_j\ s_j\ P(c|x)_j/\Sigma_j\ s_j$. For depth, the depth value of x is computed as a linear combination of the depth value from all the global templates, i.e., $d(x)=\Sigma_j\ s_j\ D_j(x)=\Sigma_j\ s_j$.

In one or more implementations, machine learning is trained such that rather than a simple classification loss, a distance (e.g., similarity) of each image is compared to the templates, e.g., global or local. Formally, a rough layout of each image is described as a sparse composition of global templates, i.e. $I_{ti}=w_iH$, where H is the matrix that concatenates all the templates in T. The machine learning training loss is thus $\|w_{ci}-w_i\|$ for image i. Then, for the inference, machine learning is used to predict the combination code $w_{ci}$, and the global layout is generated through $w_iH$.

Figure 7:
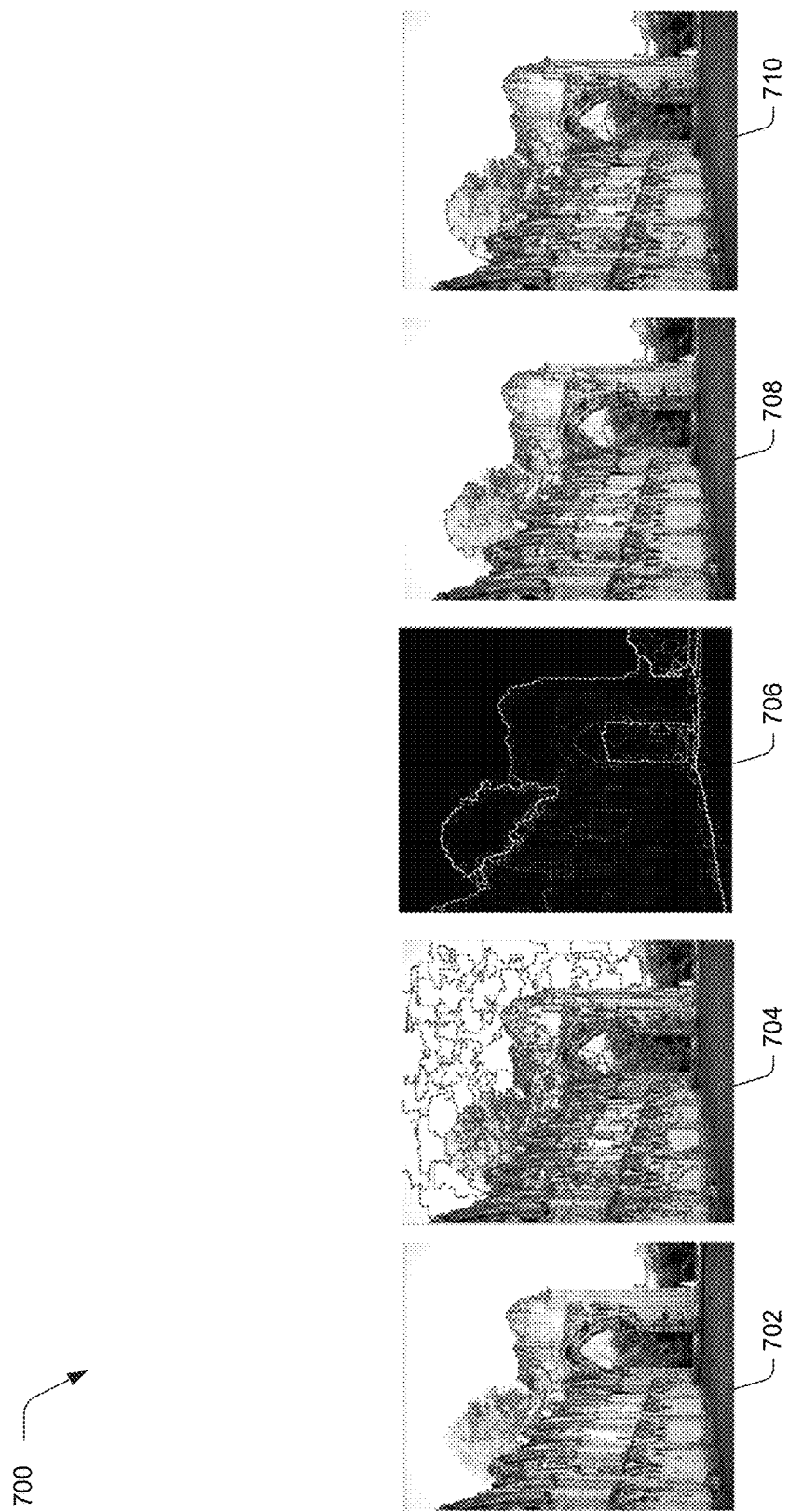
FIG. 7 depicts an example implementation of multi-level segmentation usable as part of determination of local semantic and depth layouts.

FIG. 7 depicts an example implementation 700 of multi-level segmentation usable as part of determination of local semantic and depth layouts. Multi-level segmentation may be used to capture levels of context and appearance information. This may include changing segment parameters and changing thresholds as well as information from appearance, semantic edges and spatial information to generate compact, semantic meaningful segments.

Formally, an image 702 is segmented into 350 super pixels. In the meanwhile, a closed-form edge technique is used to generate a semantic edge map 704 having strong boundaries that are enclosed. Then, a kernel k-means technique is used to cluster similar segments into multiple levels 708, 710 (e.g., having fifteen, thirty, and fifty segments), with the distance as follows:

$$k(S_i,S_j)=\lambda_1\text{Geo}(S_i,S_j)+\lambda_2\|f_{s_i}-f_{s_j}\| \quad (3)$$

where $\text{Geo}(S_i, S_j)$ is the geodesic distance on of $S_i$ and $S_j$ over the semantic edge map and $f_{s_i}$ is the local appearance feature of segment $S_i$, which is composed of mean and covariance of the pixel RGB inside the segment.

Reference will now be made again to FIG. 2 to discuss local template 210 generation by the template generation module 124. Similar to global template prediction, local template 210 generation may be formulated as a template classification problem. To generate the local templates 210, the template generation module 124 considers both semantic and depth information to ensure consistency.

The local templates 210 typically correspond to a single semantic tag when describing a local semantic layout for a segment of an image. As such, a local semantic layout of the local templates pertains to a single object and each of the pixels in the segment is semantically tagged as corresponding to that object, e.g., plant, ground, sky, vertical, and so forth. A local depth layout 218 of the local templates 210 describes relative depth values of pixels in relation to each other within the segment.

Formally, given a segment S, a single semantic label s(S) and a depth transition d(S) is assigned to the segment from a ground truth. A semantic label is chosen that represents a majority of the pixels inside the segment, and for depth transition, the depth is normalized into [0, 1]. If a number of segments is too great to fit in memory for joint clustering, the clustering is separated into two steps. In the first step, the segments are separated based on its semantic label.

In the second step, the segments are clustered within each semantic label through the $L_1$ distance of the depth transition to generate the local depth layout. The cluster number is assigned within each semantic class based on the geometric complexity of the semantic class. In addition, the semantic classes are identified that share similar geometric properties, such as ground and grass, and the segments within all the shared classes are clustered together. The clustered depth templates are then assigned to the shared semantic classes. Finally, clusters having few examples of segments (e.g., less than ten) are pruned, and these examples are reassigned to the closest class from the remaining. The local templates 210 are then used as part of local semantic and depth layout prediction as further described below.

Referring now to FIG. 4, similar with global templates, in order to train machine learning of the local determination module 128, multi-level segments 402, 404, 406 of the image 112 are taken successively as inputs. The local determination module 128 then provides as an output a respective ground truth corresponding semantic label and depth transition template in order to describe a local semantic and depth layout of the segment.

The global semantic and depth layouts 302, 304 determined by the global determination module 126 in FIG. 3 may be used by the local determination module 128 to guide this process. The global semantic and depth layouts 302, 304, for instance, provide a global context which helps address local confusion that may be encountered by the local determination module 128. Specifically, guidance from global semantic and depth layouts 302, 304 may be incorporated into the last layer of prediction as part of machine learning Formally, for a segment S, the $7_{th}$ and $8_{th}$ a feature is output from tuned machine learning, i.e. $f_7$ and $f_8$. In addition, the illustrated bounding boxes of the segments 402, 404, 406 are mapped into the area of a global semantic and depth layout, and the corresponding semantic distributions and depth values are taken as additional features, i.e. $f_s$ and $f_d$. To balance the influence of different features, each feature is first normalized with $L_2$ norm, and then the features and weights of each type of feature base are concatenated on its relative feature length, i.e. $w_i = \Sigma_j L_j/L_i$ where $L_i$ is the feature length of type i.

Figure 8:
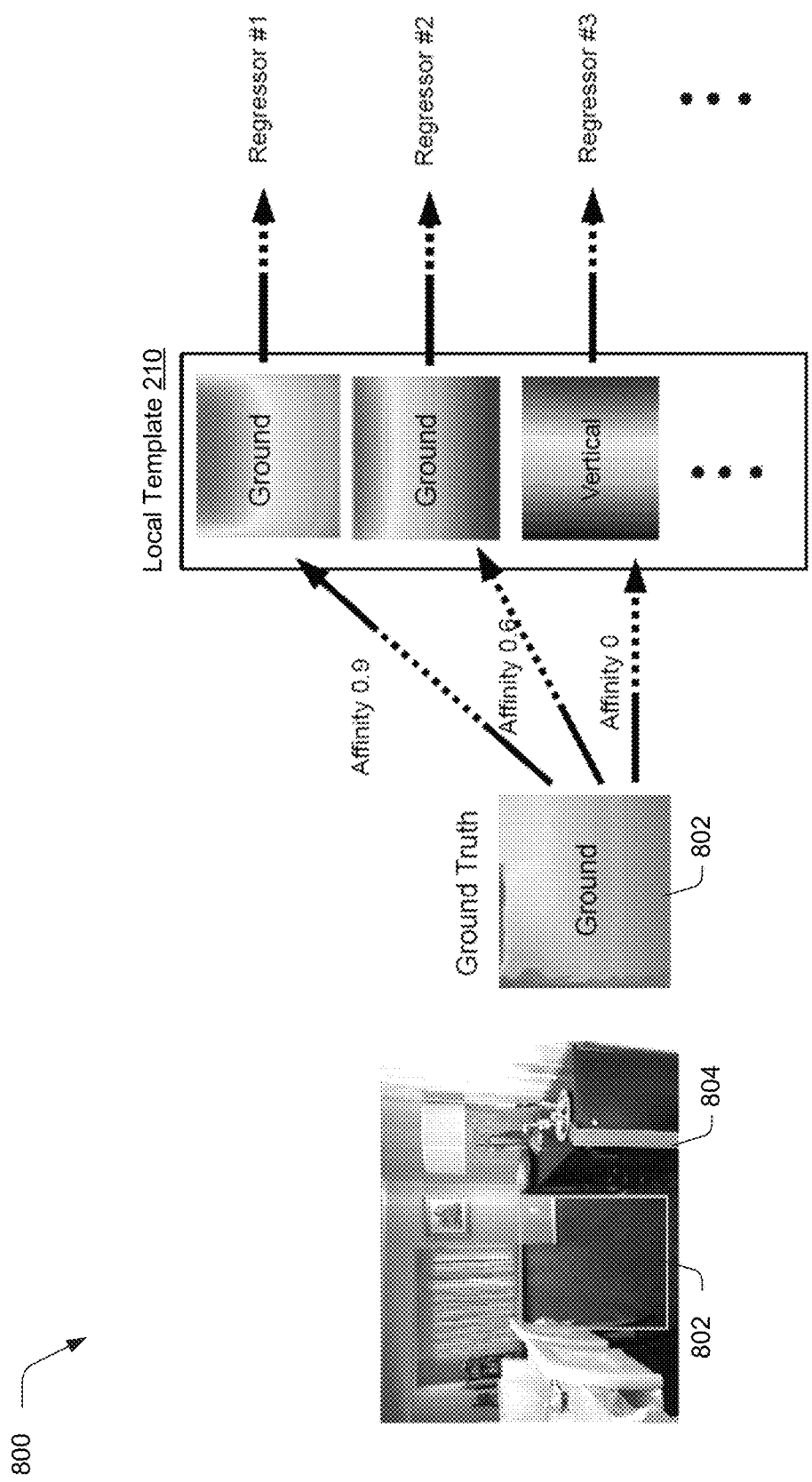
FIG. 8 depicts an example implementation of computation of affinity scores from each segment taken from an image to each of a plurality of local templates.

Different from global classification, the similarity of each segments to the trained local templates may be determined. As illustrated in an example implementation 800 of FIG. 8, affinity scores are computed from each segment 802 taken from an image 804 to each of the local templates 210.

For each local template 210, a support vector regression (SVR) is trained for prediction. Formally, given a segment $S_i$, the affinity of the segment 802 to a respective one of the local templates 210 is computed as follows:

$$A(S_i, D_j) = 1\{s(S_i) = s(D_j)\}S(S_i, D_j)/\!_j^{max} S(S_i, D_j) \quad (3)$$

$$S(S_i, D_j) = \exp(-\|d(S_i) - d(D_j)\|_1/\sigma)$$

where σ is 0:85AT and AT is the area of local template 210. Then, during the inference, the top K local templates 210 are taken by the local determination module 128 of FIG. 4 with highest prediction scores for later merging of the segments.

Figure 9:
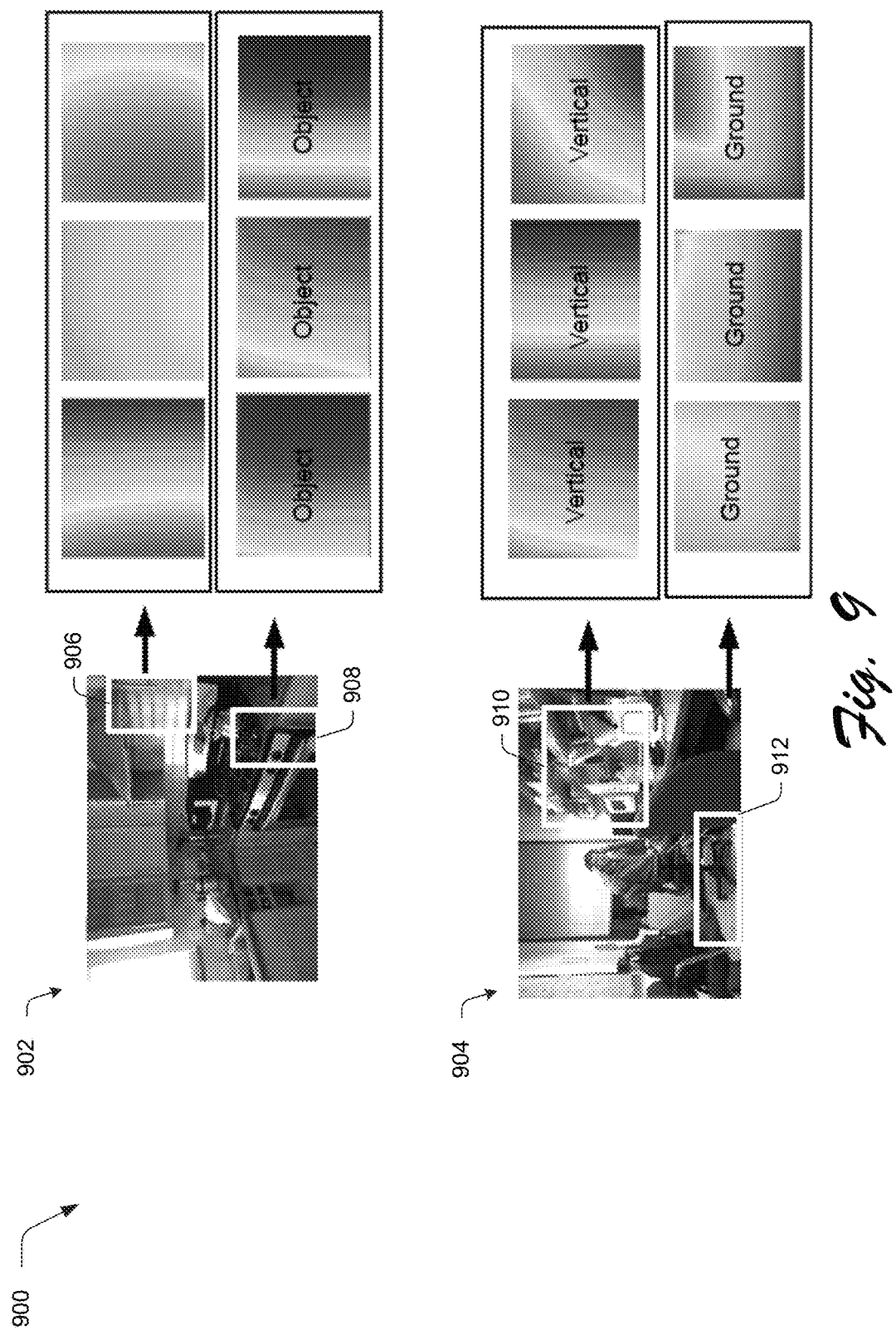
FIG. 9 depicts an implementation showing examples of predicted results for segments.

FIG. 9 depicts an implementation 900 showing two examples 902, 904 of predicted results for segments 906, 908, 910, 912. As illustrated, prediction of depth is robust to image variations and blurring and does not have plane assumptions which make this approach generalize well to many scenarios while avoiding traditional line detection.

Returning again to FIG. 4, the merge calculation module 130 receives local semantic and depth layouts from the local determination module 128 and merges them using the global semantic and depth layouts 302, 304. The merging may be performed using a variety of different techniques, an example of which for semantic labelling involves use of a pixel-wise conditional random field (CRF) for prediction. In this technique, each graph node is a pixel x and the edges are four connected neighbor pixels.

For a unary term, a semantic prediction score is obtained from the pixels corresponding segments, and for smoothness, the probability difference between neighbor pixels is computed. Formally, the formulation can be written as follows:

$$\min_L \sum_x -\log(P(l|x)) + \lambda_2 \sum_{x_i,x_j} 1\{l_i \neq l_j\} \|P(1|x_i) - P(1|x_i)\| \|P(l|x) = \quad (4)$$

$$\Sigma_i P(l|S_i) P(S_i|x),$$

where $P(l|S_i)$ is the probability that is computed from the local semantic layout. Specifically, for a segment S, its predicted score $v_j$ is calculated from SVR for each local template $T_j$ which contains a semantic label $s_j$ and a depth transition $d_j$. Then, the probability of a segment predicted as label l is computed as, $$P(l|S) = \sum_j sigmoid(v_j) 1\{s_i == l\} \bigg/ \sum_j sigmoid(v_j), \quad (5)$$

Additionally, graph cut may be performed to efficiently solve such an energy function to get the final semantic labelling results.

For depth, a center absolute depth value d and a transition scale s for each segments is inferred by the merge calculation module 130 to merge the depth transition $d_j$ in order to get the absolute depth value of each pixel to form the depth map 122.

As smoothness may be hard to achieve at a pixel level, the super pixel 704 technique above in relation to FIG. 7 is used for graph nodes and the edges are the adjacent edges between the super pixels. The unary term is considered, unitarily, as the absolute depth and scale change of a segment from the corresponding place in a global depth and semantic layout. Smoothness is considered as a depth offset within the overlapping area 1002 of two bounding boxes from adjacent super pixels as shown in an example implementation 1000 of FIG. 10.

Formally, this formulation may be written as follows:

$$\min_{D,S} \lambda_1 \sum_r L(d_r, s_r) + \qquad (6)$$

$$\lambda_2 \sum_{r_i, r_j} do(O_{d_{r_i}, d_{r_j}, s_{r_i}, s_{r_j}}(r_i r_j)) w_s(r_i, r_j) w_a(r_i, r_j) w_d(r_i, r_j)$$

$$L(d_r, s_r) = \|d_r - gd_r\|_1 + \|s_r - gs_r\|_1$$

$$do(O_{d_{r_i}, d_{r_j}, s_{r_i}, s_{r_j}}(r_i, r_j)) = 1\{l_{r_i} = l_{r_j}\} do(OB_{d_{r_i}, d_{r_j}, s_{r_i}, s_{r_j}}(r_i r_j)) + \qquad (7)$$

$$1\{l_{r_i} \neq l_{r_j}\} do(OR_{d_{r_i}, d_{r_j}, s_{r_i}, s_{r_j}}(r_i r_j))$$

where r is a super pixel segment, D, S are the possible values for the absolute center depth of the segment $d_r$, and the scale of the depth transition $s_r$.

For unary term, in one aspect, the L1 distance is considered between the predicted depth value $d_r$ of a segment and its corresponding absolute depth value gdr from the global template. In another aspect, the distance between its predicted scale $s_r$ and the predicted.

Figure 10:
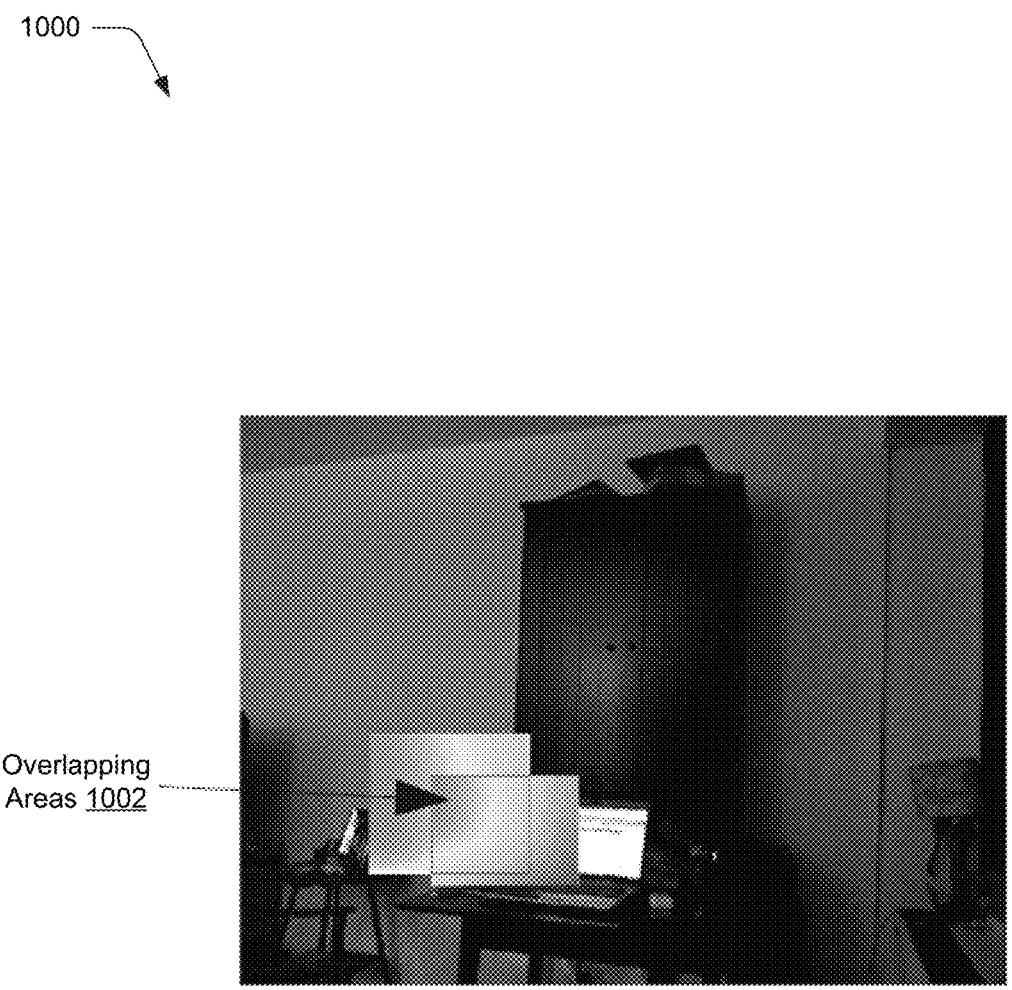
FIG. 10 depicts smoothness that is considered as a depth offset within an overlapping area of two bounding boxes from adjacent super pixels.

For smoothness term, as shown in FIG. 10, the depth offset is considered within the overlapping box of two neighbor super pixels, i.e. do $$(O_{d_{r_i}, d_{r_j}, s_{r_i}, s_{r_j}}(r_i r_j))$$

in Equation 7 above. In detail, the depth offset takes into account both the semantic label from the weight of semantic label weight of appearance similarity weight of depth from the camera in the global layout.

Practically, the absolute depth value of a segment is quantified to be a set of shift values (e.g., twenty average interpolation value within [−1, 1] meter) from the respective value in global depth layout, and the scale of the depth transition to be a set of maximum depth ranges (ten average interpolation value within [0.5, 2]). Through quantization, use of loopy belief propagation may be used for inference and to obtain the solution. In addition, in order to consider the high order smoothness, e.g., the segments on the same ground or the same wall align in a single plane, the prediction results from semantic merging are used and the ground plane is set to be a single segment node in the graph, which ensures long range smoothness.

Example Results

Figure 11:
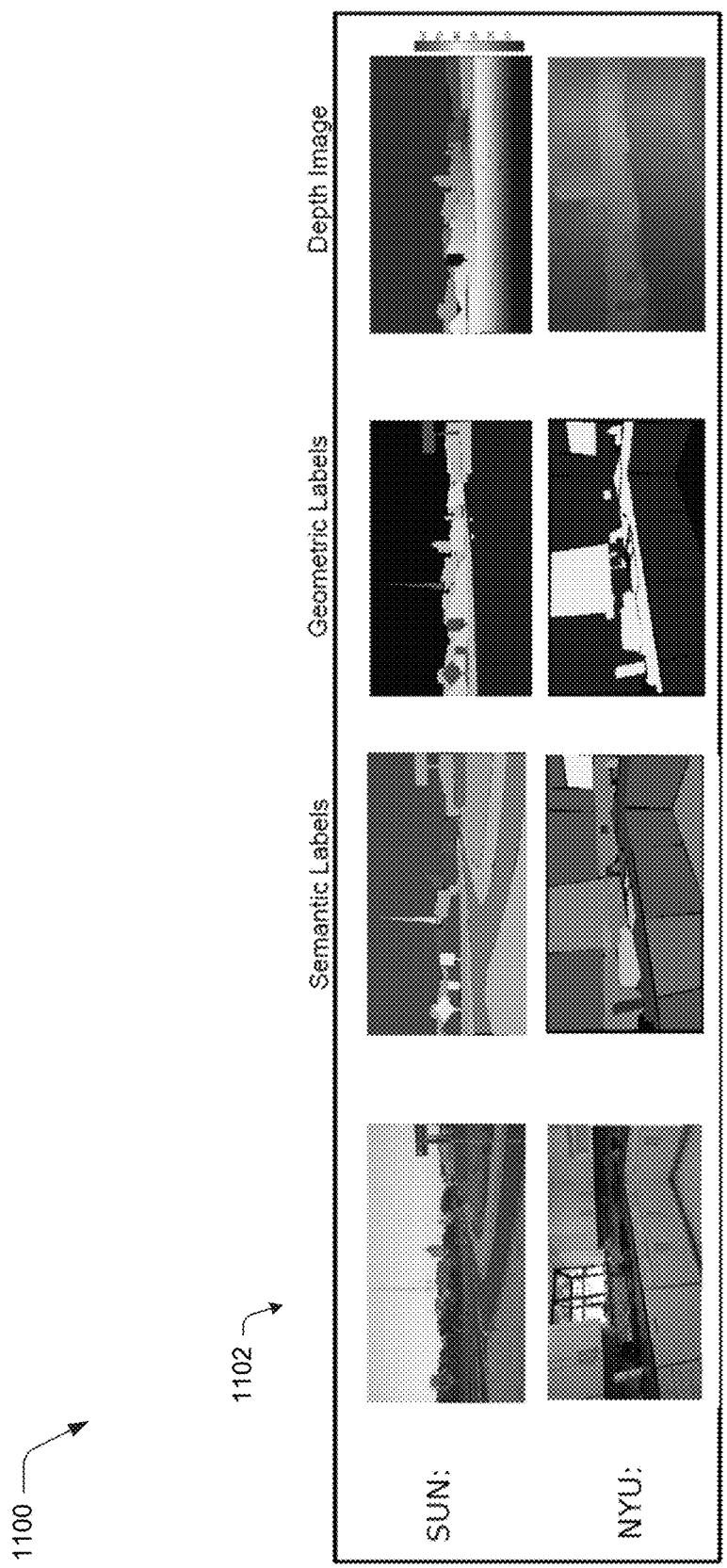
FIG. 11 depicts an example implementation in which the techniques described herein are compared for use in outdoor and indoor images.

FIG. 11 depicts an example implementation 1100 in which the techniques described herein are compared for use in outdoor and indoor images 1102, 1104. The outdoor image 1102 is representative of one image chosen from a dataset of outdoor images, e.g., 8432 images. Each semantic label is first mapped into geometric labels. Specifically, six geometric labels are constructed for outdoor images in this example, i.e., ground, sky, building, plant, mountain, and object. The depth is then generated from the mapped ground truth geometric segmentation.

The indoor image 1004 is representative of one image chosen from a dataset of indoor images, e.g., 1449 images, associated with both semantic labels and ground truth depth, e.g., from a depth sensor. The semantic labels are mapped into five general geometric labels, i.e., ground, vertical, ceiling, planar object, other object.

Figure 12:
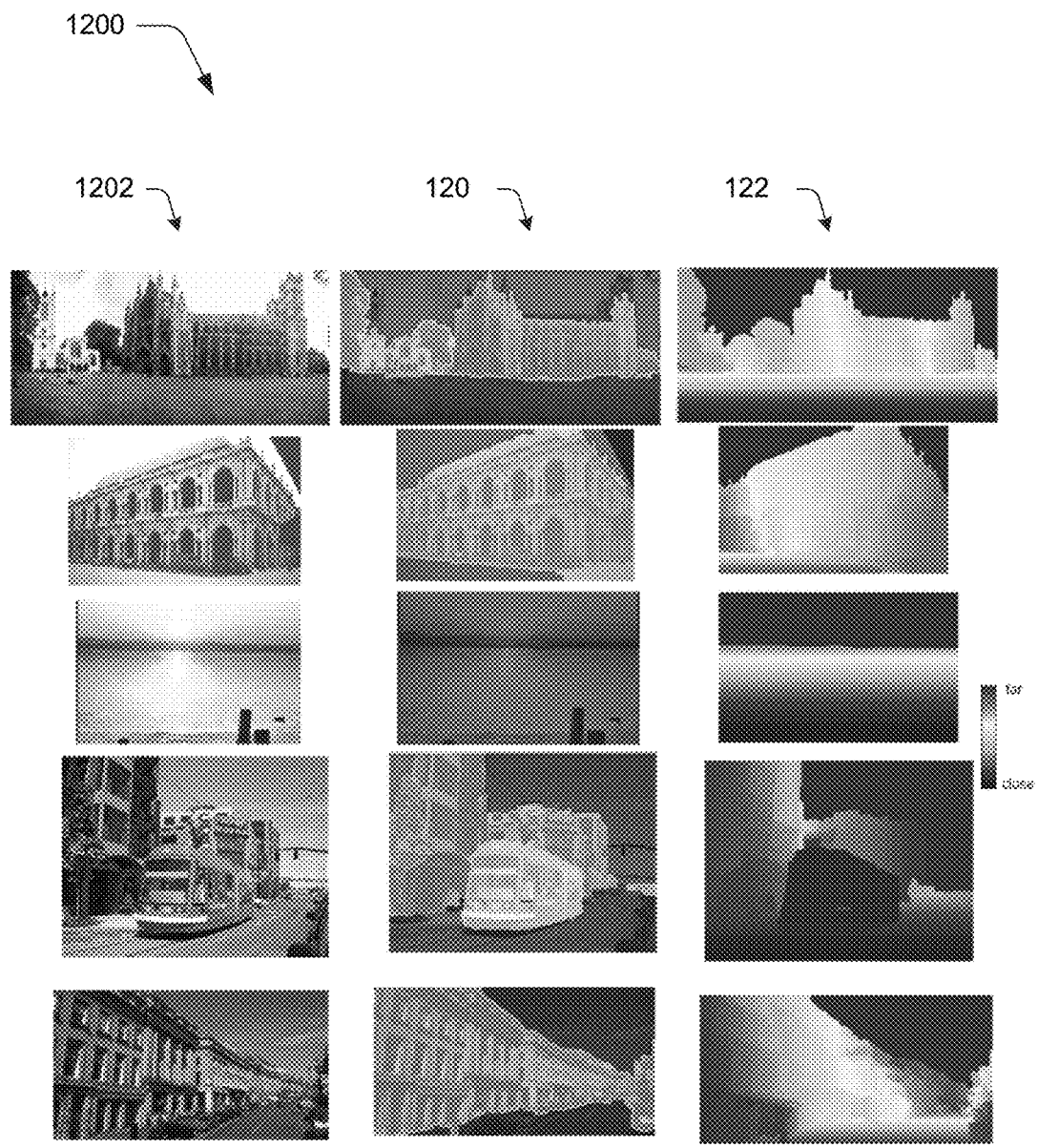
FIG. 12 depicts an example implementation showing semantically labeled images and depth maps generated from images.

FIG. 12 depicts an example implementation 1200 showing semantically labeled images 120 and depth maps 122 generated from images 1202. As illustrated, the techniques described herein provide robust semantic segmentation and provide semantically consistent depth, which ensures the visual quality of the results. In addition, from the third row of the results, it is observable that the sun in the sky and the reflections in the water have a close appearance due to guidance provided by the global templates, which may mislead conventional techniques.

Figure 13:
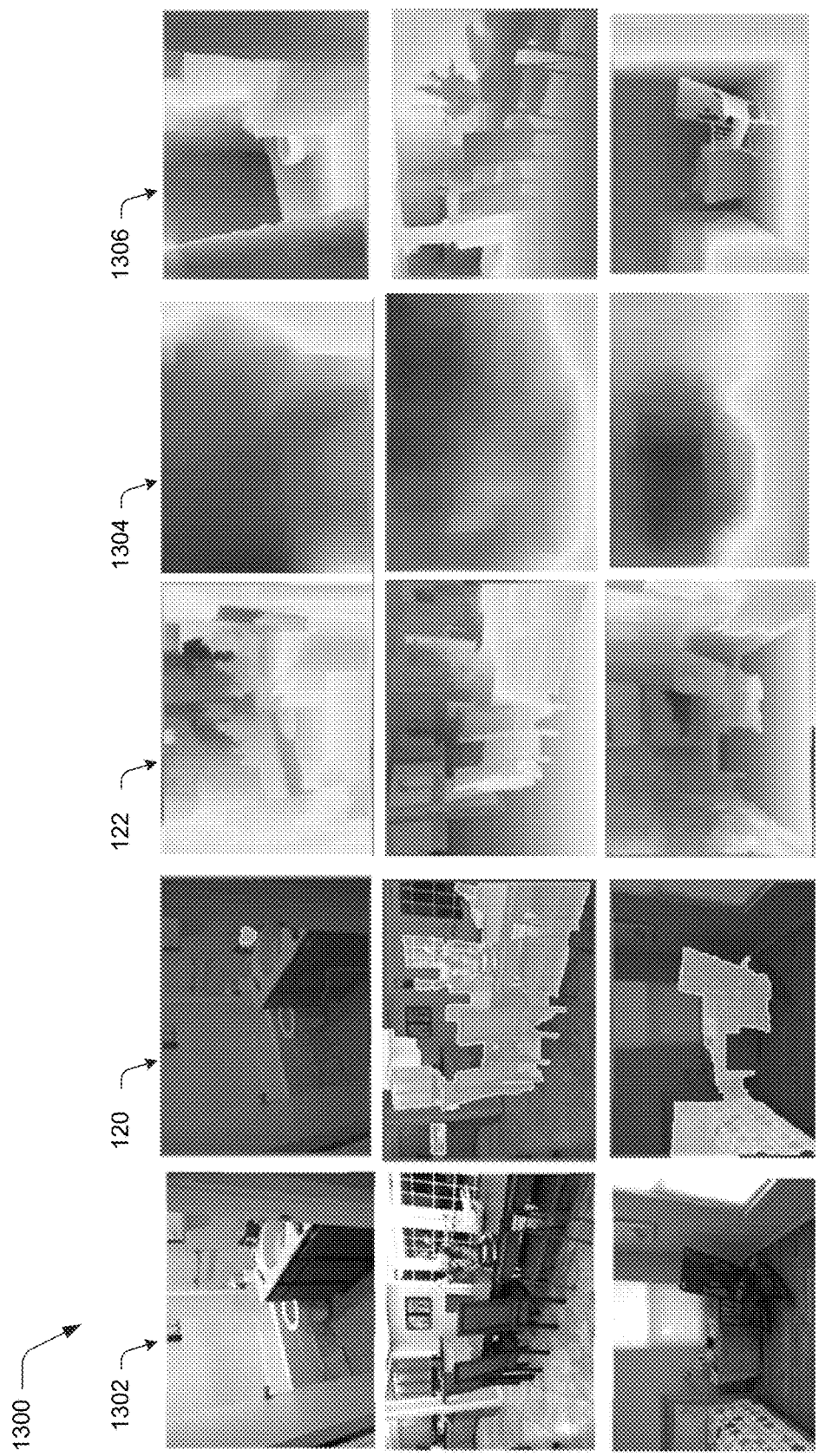
FIGS. 13 and 14 provide qualitative results for indoor images.
Figure 14:
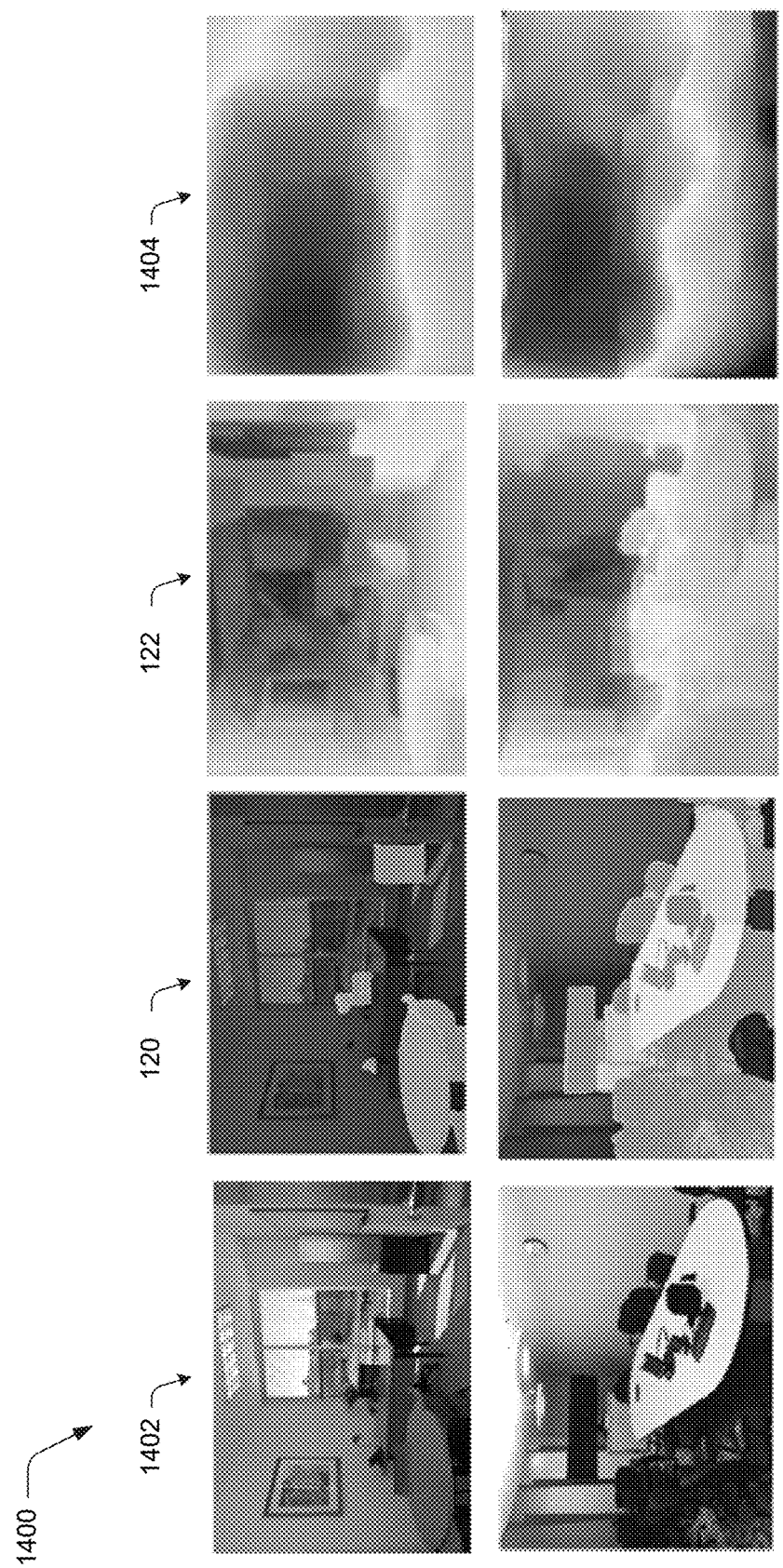

FIGS. 13 and 14 provide qualitative results 1300, 1400 for indoor images. In the qualitative results 1300 of FIG. 13, images 1302 are processed to form semantically labeled images 120 and depth maps 122. This is compared with results 1304 from a conventional depth transfer technique and a ground truth 1306 depth map generated using depth sensors. Likewise, images 1402 are processed to form semantically labeled images 120 and depth maps 122 and are compared with results 1404 from a conventional depth transfer technique. It can be observed that the depth results of the techniques described herein preserve the scene structure better than conventional depth transfer which in most cases merely provides a rough estimation.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-14.

Figure 15:
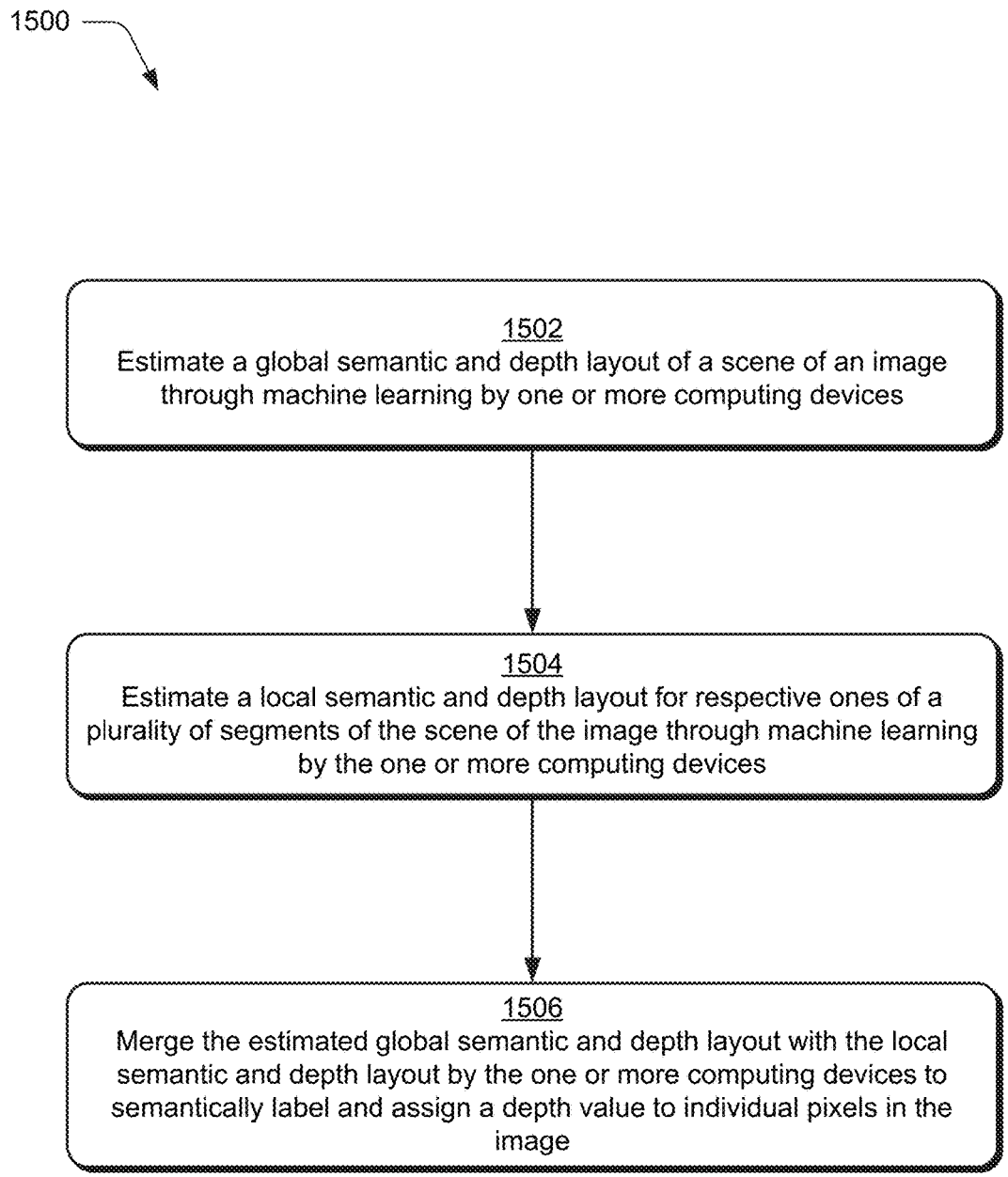
FIG. 15 is a flow diagram depicting a procedure in an example implementation in which joint depth estimation and semantic labeling techniques are described that are usable for processing of a single image.

FIG. 15 depicts a procedure 1500 in an example implementation in which Joint depth estimation and semantic labeling techniques are described that are usable for processing of a single image. Global semantic and depth layouts are estimated of a scene of the image through machine learning by the one or more computing devices (block 1502). The global semantic and depth layouts 302, 304, for instance, may be estimated based on similarity to global templates 206 as part of a classification problem that is solved by machine learning 212. The global semantic layout 302 gives coarse semantic labels to pixels in the image and the global depth layout 304 gives absolute depth values, e.g., that describes a z distance between a camera 110 and respective objects captured by the image 118.

A local semantic and depth layout is also estimated for respective ones of a plurality of segments of the scene of the image through machine learning by the one or more computing devices (block 1504). The local semantic and depth layouts may be estimated based on similarity to local templates 210 as part of a classification problem that is solved by machine learning 212. The local semantic layout generally uses a single semantic value (e.g., tag) for a segment taken from an image and the local depth layout describes relative depth values for the pixels in relation to each other. The local layouts may be guided by the global layouts to support consistency in labeling and tagging performed for segments taken from the images that are processed locally.

The estimated global semantic and depth layout is merged with the local semantic and depth layout by the one or more computing devices to semantically label and assign a depth value to individual pixels in the image (block 1506). The merge calculation module 130, for instance, may use the absolute depth values from the global depth layout along with relative depth values from the local depth layout to generate a depth map 122. Similarly, the semantically-labeled image 120 is formed from local semantic layouts guided by global semantic layouts to assign semantical labels to pixels in the image, e.g., to indicate "what" is being represented by the pixels.

Figure 16:
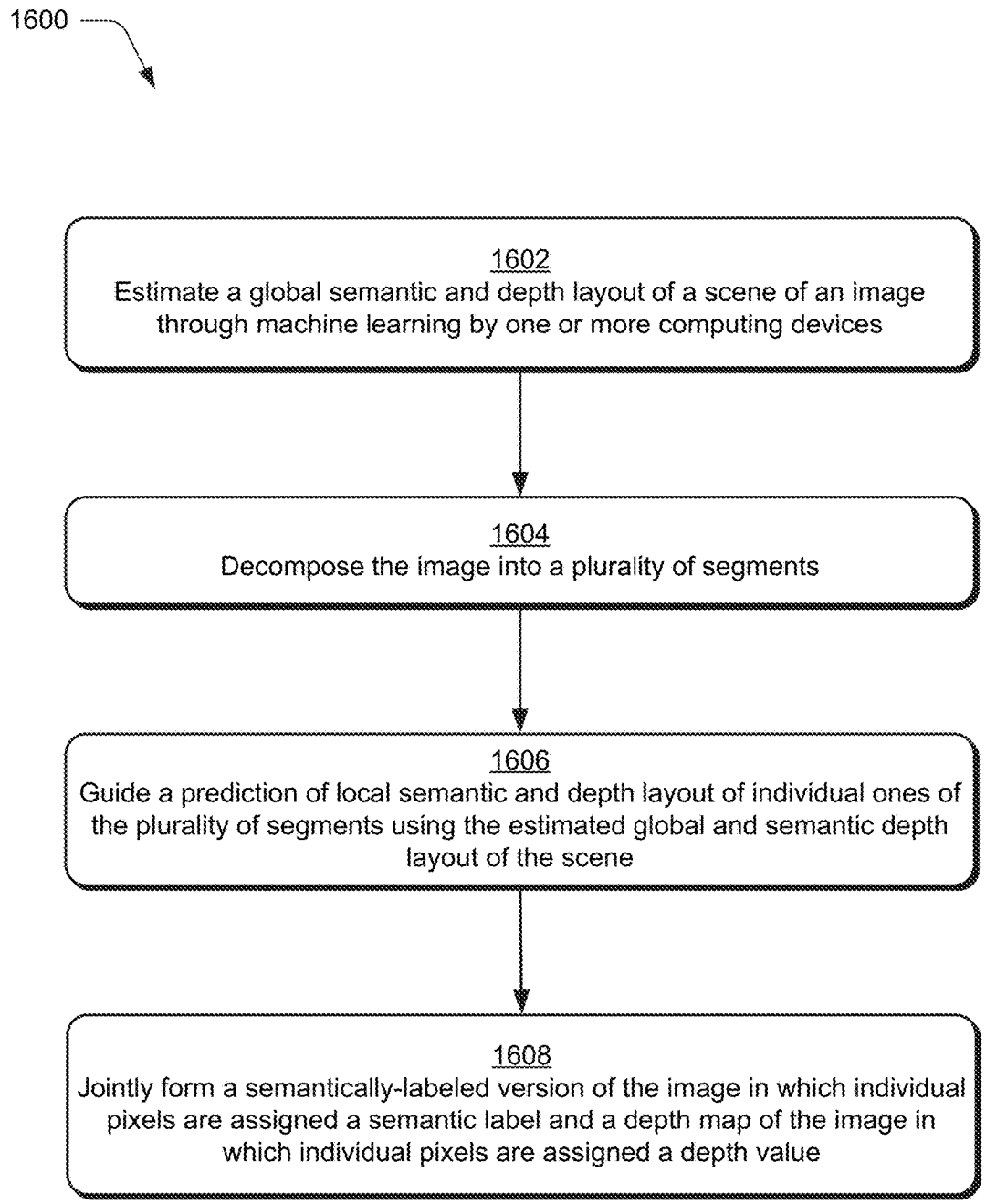
FIG. 16 is another flow diagram depicting a procedure in an example implementation in which joint depth estimation and semantic labeling techniques are described that are usable for processing of a single image.

FIG. 16 depicts a procedure 1600 in an example implementation in which Joint depth estimation and semantic labeling techniques are described that are usable for processing of a single image. A global semantic and depth layout of a scene of an image is estimated through machine learning (block 1602), e.g., through a convolutional neural network, may be performed as part of a classification problem using templates, and so on.

The image is decomposed into a plurality of segments (block 1604). This may include single level or multilevel segmentation, an example of which is shown in FIG. 4. A prediction is then made of local semantic and depth layouts of individual ones of the plurality of segments is guided using the estimated global and semantic depth layout of the scene (block 1606), e.g., using templates as part of a classification problem, performed directly without templates, and so on.

A semantically-labeled version of the image in which individual pixels are assigned a semantic label is jointly formed along with a depth map of the image in which individual pixels are assigned a depth value (block 1608). In this way, formation of the semantically-labeled image 120 and depth map 122 may be performed together to share information and improve consistency as described above.

Example System and Device

Figure 17:
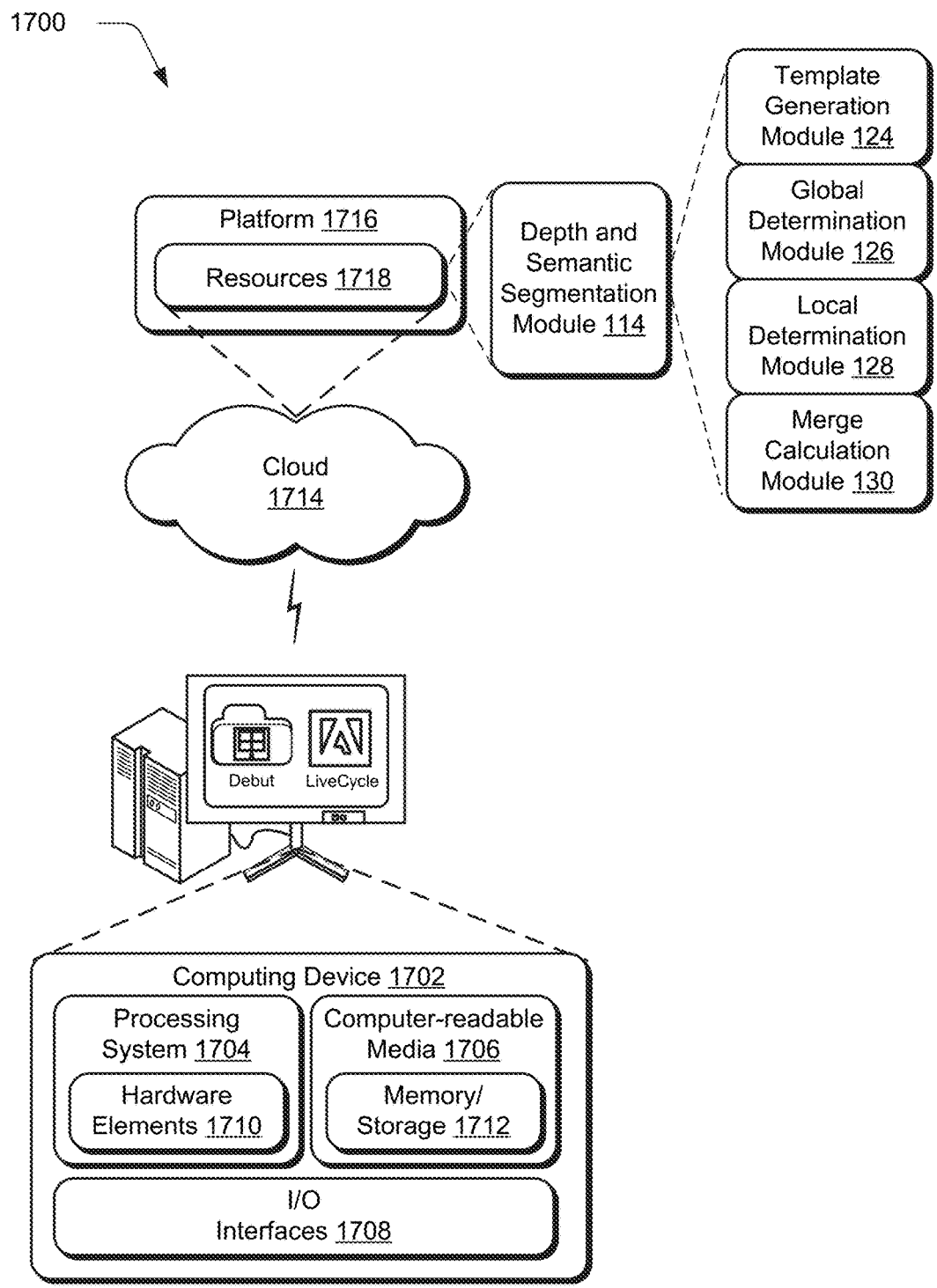
FIG. 17 illustrates an example system including various components of an example device that can be implemented as any type of computing device as described and/or utilize with reference to FIGS. 1-16 to implement embodiments of the techniques described herein.

FIG. 17 illustrates an example system generally at 1700 that includes an example computing device 1702 that is representative of one or more computing systems and/or devices that may implement the various techniques described herein. This is illustrated through inclusion of the depth and semantic segmentation module 114 including a template generation module 124, global determination module 126, local determination module 128, and merge calculation module 130. The computing device 1702 may be, for example, a server of a service provider, a device associated with a client (e.g., a client device), an on-chip system, and/or any other suitable computing device or computing system.

The example computing device 1702 as illustrated includes a processing system 1704, one or more computer-readable media 1706, and one or more I/O interface 1708 that are communicatively coupled, one to another. Although not shown, the computing device 1702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1704 is representative of functionality to perform one or more operations using hardware. Accordingly, the processing system 1704 is illustrated as including hardware element 1710 that may be configured as processors, functional blocks, and so forth. This may include implementation in hardware as an application specific integrated circuit or other logic device formed using one or more semiconductors. The hardware elements 1710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1706 is illustrated as including memory/storage 1712. The memory/storage 1712 represents memory/storage capacity associated with one or more computer-readable media. The memory/storage component 1712 may include volatile media (such as random access memory (RAM)) and/or nonvolatile media (such as read only memory (ROM), Flash memory, optical disks, magnetic disks, and so forth). The memory/storage component 1712 may include fixed media (e.g., RAM, ROM, a fixed hard drive, and so on) as well as removable media (e.g., Flash memory, a removable hard drive, an optical disc, and so forth). The computer-readable media 1706 may be configured in a variety of other ways as further described below.

Input/output interface(s) 1708 are representative of functionality to allow a user to enter commands and information to computing device 1702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1710 and computer-readable media 1706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1710. The computing device 1702 may be configured to implement particular instructions and/or functions corresponding to the software and/or hardware modules. Accordingly, implementation of a module that is executable by the computing device 1702 as software may be achieved at least partially in hardware, e.g., through use of computer-readable storage media and/or hardware elements 1710 of the processing system 1704. The instructions and/or functions may be executable/operable by one or more articles of manufacture (for example, one or more computing devices 1702 and/or processing systems 1704) to implement techniques, modules, and examples described herein.

The techniques described herein may be supported by various configurations of the computing device 1702 and are not limited to the specific examples of the techniques described herein. This functionality may also be implemented all or in part through use of a distributed system, such as over a "cloud" 1714 via a platform 1716 as described below.

The cloud 1714 includes and/or is representative of a platform 1716 for resources 1718. The platform 1716 abstracts underlying functionality of hardware (e.g., servers) and software resources of the cloud 1714. The resources 1718 may include applications and/or data that can be utilized while computer processing is executed on servers that are remote from the computing device 1702. Resources 1718 can also include services provided over the Internet and/or through a subscriber network, such as a cellular or Wi-Fi network.

The platform 1716 may abstract resources and functions to connect the computing device 1702 with other computing devices. The platform 1716 may also serve to abstract scaling of resources to provide a corresponding level of scale to encountered demand for the resources 1718 that are implemented via the platform 1716. Accordingly, in an interconnected device embodiment, implementation of functionality described herein may be distributed throughout the system 1700. For example, the functionality may be implemented in part on the computing device 1702 as well as via the platform 1716 that abstracts the functionality of the cloud 1714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method of performing joint depth estimation and semantic labeling of an image by one or more computing devices, the method comprising:
   estimating global semantic and depth layouts of a scene of the image through machine learning by the one or more computing devices;
   estimating local semantic and depth layouts for respective ones of a plurality of segments of the scene of the image through machine learning by the one or more computing devices, the local depth layouts including relative depth values for an individual pixel in the image representing a depth of the individual pixel in relation to other pixels; and
   merging the estimated global semantic and depth layouts with the estimated local semantic and depth layouts by the one or more computing devices to semantically label and assign a depth value to the individual pixels in the image.

2. A method as described in claim 1, wherein the estimating of the global semantic and depth layouts is performed as a template classification problem by selecting one or more of a plurality of global templates having corresponding global semantic and depth layouts as corresponding to the scene of the image.

3. A method as described in claim 2, wherein the selecting is performed using a plurality of the global templates in combination to perform the estimating of the global semantic and depth layout of the scene of the image.

4. A method as described in claim 2, further comprising generating the plurality of global templates by using a kernel k-means with a distance from a semantic label ground truth and depth ground truth that are associated with each training image in a dataset.

5. A method as described in claim 1, wherein the estimating of the global semantic and depth layouts is performed through the machine learning by learning a model that directly predicts global semantic and depth layouts of the scene such that each pixel in the image has a corresponding semantic label and depth value.

6. A method as described in claim 1, wherein the estimated global depth layout of the scene assigns a respective absolute distance to a plurality of pixels in the image.

7. A method as described in claim 1, wherein the estimating of the local semantic and depth layout is performed as a template classification problem by selecting one or more of a plurality of local templates having corresponding local semantic and depth layouts as corresponding to the image.

8. A method as described in claim 1, wherein the machine learning is performed using a convolutional neural network (CNN) or support vector machine (SVM).

9. A method as described in claim 1, wherein the merging is performed to generate the depth map using absolute distance values estimated by the global depth layout and relative depth values estimated by the local depth layout.

10. A method as described in claim 1, wherein the estimating of the global semantic and depth layouts, the estimating of the local semantic and depth layouts, and the merging are performed to jointly calculate the semantic values and depth labels to the pixels of the image.

11. A method as described in claim 1, wherein the merging includes smoothing the semantically labels depth values assigned to individual pixels in the image.

12. A system comprising:
one or more computing devices implemented at least partially in hardware, the one or more computing devices configured to perform operations comprising:
estimating global semantic and depth layouts of a scene of an image through machine learning;
decomposing the image into a plurality of segments;
guiding a prediction of local semantic and depth layout of individual ones of the plurality of segments using the estimated global and semantic depth layouts of the scene, the local depth layout including relative depth values for an individual pixel in the image representing a depth of the individual pixel in relation to other pixels; and
jointly forming a semantically-labeled version of the image in which the individual pixels are assigned a semantic label and a depth map of the image in which the individual pixels are assigned a depth value.

13. A system as described in claim 12, wherein the decomposing is performed by maintaining semantic region boundaries.

14. A system as described in claim 13, wherein the maintaining is performed to consider information from appearance, semantic edges, or spatial information.

15. A system as described in claim 12, wherein:
the estimating of the global semantic and depth layouts is performed as a template classification problem by selecting one or more of a plurality of global templates having corresponding global semantic and depth layouts as corresponding to the scene of the image; and
the prediction of the local semantic and depth layout of the individual ones of the plurality of segments includes estimating the local semantic and depth layout through machine learning.

16. A system comprising:
a global determination module implemented at least partially in hardware, the global determination module for estimating global semantic and depth layouts of a scene of an image through machine learning;
a local determination module implemented at least partially in hardware, the local determination module for estimating local semantic and depth layouts for respective ones of a plurality of segments of the scene of the image through machine learning, the local depth layouts including relative depth values for an individual pixel in the image representing a depth of the individual pixel in relation to other pixels; and
a merge calculation module implemented at least partially in hardware, the merge calculation module for merging the estimated global semantic and depth layouts with the local semantic and depth layouts to semantically label and assign a depth value to the individual pixels in the image.

17. A system as described in claim 16, wherein the global determination module is configured to estimate the global semantic and depth layouts as a template classification problem by selecting one or more of a plurality of global templates having corresponding global semantic and depth layouts as corresponding to the scene of the image.

18. A system as described in claim 16, wherein the global determination module is configured to estimate the global semantic and depth layouts is performed through the machine learning by learning a model that directly predicts the global semantic and depth layouts of the scene such that each pixel in the image has a corresponding semantic label and depth value.

19. A system as described in claim 16, wherein the estimating of the local semantic and depth layouts is performed as a template classification problem by selecting one or more of a plurality of local templates having corresponding local semantic and depth layouts as corresponding to the image.

20. A method as described in claim 1, wherein the merging is performed to generate a semantically labeled image by combining the semantic predictions of the local semantic layouts with the global semantic layouts.

* * * * *